US005691830A

United States Patent [19]
Dickson et al.

[11] Patent Number: 5,691,830
[45] Date of Patent: Nov. 25, 1997

[54] HOLOGRAPHIC OPTICAL SYSTEM INCLUDING WAVEPLATE AND ALIASING SUPPRESSION FILTER

[75] Inventors: LeRoy David Dickson, Morgan Hill; Francis Stephen Luecke, San Jose, both of Calif.; James Matthew Zavislan, Auburn, N.Y.

[73] Assignee: International Business Machines Corporation, Armonk, N.Y.

[21] Appl. No.: 403,113

[22] Filed: Mar. 13, 1995

Related U.S. Application Data

[63] Continuation of Ser. No. 951,641, Sep. 25, 1992, abandoned, which is a continuation-in-part of Ser. No. 774,410, Oct. 10, 1991, abandoned.

[51] Int. Cl.$^6$ .............................. G02B 5/32; G02B 5/30; G02B 27/28
[52] U.S. Cl. ........................... 359/15; 359/1; 359/24; 359/487; 359/495; 359/497
[58] Field of Search ........................... 359/15, 19, 487, 359/488, 495, 497, 1, 24

[56] References Cited

U.S. PATENT DOCUMENTS

| | | | |
|---|---|---|---|
| 3,588,224 | 6/1971 | Pritchard | 350/157 |
| 4,100,570 | 7/1978 | Nobutoki et al. | 358/44 |
| 4,245,882 | 1/1981 | Chang | 350/3.72 |
| 4,472,735 | 9/1984 | Shinozaki et al. | 358/47 |
| 4,497,534 | 2/1985 | Sincerbox | 350/3.72 |
| 4,539,584 | 9/1985 | Otake | 358/44 |
| 4,626,897 | 12/1986 | Sato et al. | 358/44 |
| 4,637,678 | 1/1987 | Moss et al. | 350/3.7 |
| 4,722,037 | 1/1988 | Davis | 362/231 |
| 4,743,100 | 5/1988 | Nakada et al. | 350/403 |
| 4,761,682 | 8/1988 | Asaida | 358/50 |
| 4,776,652 | 10/1988 | Ih | 350/3.72 |
| 4,848,862 | 7/1989 | Yamazaki et al. | 350/3.71 |
| 5,009,502 | 4/1991 | Shih et al. | 359/19 |
| 5,013,107 | 5/1991 | Biles | 350/3.7 |
| 5,038,352 | 8/1991 | Lenth et al. | 372/21 |

FOREIGN PATENT DOCUMENTS

| | | |
|---|---|---|
| 136775-A | 7/1979 | Germany . |
| 02019821 | 2/1982 | Japan . |

OTHER PUBLICATIONS

J.B. Tait, "Multiple Hologram Readout", IBM Technical Disclosure Bullettin, vol. 11, No. 11 (Apr. 1969), p. 1391.
H. Kogelnik, "Coupled Wave Tehory for Thick Hologram Gratings", Bell System Technical Journal, vol. 48, No. 9 (Nov. 1969), pp. 2909–2947.
Collier et al., "Optical Holography", Academic Press (1971), pp. 228–264.
M.R. Latta et al., "Compact Single Element Bidirectional Optical Disk Lens Element", IBM Technical Disclosure Bulletin, vol. 31, No. 3 (Aug. 1988), pp. 18–23.
L.D. Dickson, et al., "Methods for the Reduction of Paper Noise in a Bar Code Scanner", IBM Technical Disclosure Bulletin, vol. 31, No. 9 (Feb. 1989), pp. 442–443.
J.E. Grievenkamp, "Color Dependent Optical Prefilter for the Suppression of Aliasing Artifacts", Applied Optics, vol. 29, No. 5 (Feb. 10, 1990), pp. 676–684.
L.H. Cescato et al., "Holographic Quarterwave Plates", Applied Optics, vol. 29, No. 22 (Aug. 1, 1990), pp. 3286–3290.

Primary Examiner—Paul M. Dzierzynski
Assistant Examiner—Darren E. Schuberg
Attorney, Agent, or Firm—Baker, Maxham, Jester & Meador

[57] ABSTRACT

A holographic optical system includes volume hologram configurations providing a waveplate for, e.g. an optical storage device, and an aliasing suppression filter. The waveplate has diffraction characteristics adapted to impart a propagation delay for selected polarization directions. By controlling the propagation delay and the angle of an incident light beam, an output beam having altered polarization characteristics can be produced. Quarter waveplates for reflective optical storage systems and half waveplates for magneto-optical storage systems are disclosed. The holographic aliasing suppression filter divides an input optical beam into spatially separated components and may be configured to be polarization insensitive or color selective.

25 Claims, 18 Drawing Sheets

HOLOGRAPHIC OPTICAL SYSTEM INCLUDING WAVEPLATE AND ALIASING SUPPRESSION FILTER

CROSS-REFERENCE TO RELATED APPLICATION

This application is a continuation of application Ser. No. 07/951,641, filed Sep. 25, 1992, now abandoned, which is a continuation-in-part of application Ser. No. 07/774,410, filed on Oct. 10, 1991, now abandoned.

BACKGROUND OF THE INVENTION

The present invention relates to holographic optical systems including optical waveplates and filters, and applications for their use in optical devices including optical storage systems and optical imaging devices.

An optical waveplate introduces a delay in propagation for light polarized in one direction relative to light polarized in an orthogonal direction. When a linearly polarized beam of light is incident on the device at the proper angle, and with the proper polarization direction, the polarization direction of the emerging light can be different. Depending on the particular properties and thickness of the waveplate, the emerging light can be circularly polarized, elliptically polarized, or linearly polarized with the direction of polarization different from that of the incident light.

Quarter waveplates have been used in optical storage devices for altering the polarization of a laser beam to separate an incident beam from an information carrying return beam reflected from an optical storage medium. Storage devices of this type include write-once-read-many (WORM) drives, OD-ROM drives and magneto-optic (erasable) drives.

A conventional waveplate uses a birefringent material to give different propagation velocities for different polarization vectors. The classic birefringent material is the tetrahedral calcite crystal or "Iceland spar", known chemically as calcium carbonate or $CaCO_3$. In general, birefringent materials, such as calcite and quartz, can be costly and difficult to manufacture in large sizes.

Birefringent materials have also been used for aliasing suppression or "blur" filters. The birefringent material converts an input beam into a pair of spatially separated output beams having different polarization directions. This beam separation can be used to blur an input optical image to reduce aliasing effects in solid state cameras such as video cassette cameras having solid state detectors such as charge-coupled devices.

Holograms are recordings of light intensity patterns created by the interference of two beams of mutually coherent light (the two beams are usually obtained by splitting a single laser beam). There are two major categories of holograms: transmissive and reflective. These two categories are further divided into two physical types of holograms: surface relief holograms and volume holograms. Surface relief holograms can be recorded using photolithographic processes. The interference pattern is recorded as a periodic variation in thickness of the material while the refractive index of the material remains fixed.

In a volume hologram, the interference pattern is recorded as a periodic variation in the refractive index of the material while the thickness of the material remains fixed. The periodic variation in refractive index creates surfaces of peak refractive index within the material. These surfaces are referred to as "Bragg surfaces". When the interference pattern is created by two plane waves or two waves with identical curvature at the hologram surface, the Bragg surfaces will be Bragg planes.

When the hologram is re-illuminated by one of the original beams at an angle that results in maximum diffraction efficiency, the internal angle of the beam relative to the Bragg planes is referred to as the "Bragg angle". The external angle of incidence at which maximum diffraction efficiency occurs is also often referred to as the Bragg angle.

Recently, surface relief holograms have been used for optical data storage applications. These holograms allow beams of light to be separated for various purposes. These surface relief hologram systems include the following Japanese applications: JP 1-13246, published Jan. 18, 1989; JP 1-55745, published Mar. 2, 1989; JP 1-55746, published Mar. 2, 1989; JP 1-86337, published Mar. 31, 1989; JP 1-186332, published Mar. 31, 1989; JP 1-146143, published Jun. 8, 1989; JP 1-53359, published Mar. 1, 1989; JP 63-25845, published Feb. 3, 1988; JP 62-219340, published Sep. 26, 1987; and JP 61-123032, published Jun. 10, 1986.

A problem with surface relief holograms is that they are not able to achieve efficient polarization separation except for a limited range of diffraction angles. Polarization separation is very important in magneto-optic systems where the data is sensed as changes in the plane of polarization of light reflected from the optical media.

Volume holograms can be used to do polarization separation over a wide range of diffraction angles. U.S. Pat. No. 4,497,534 issued Feb. 5, 1985 and U.S. Pat. No. 5,013,107 issued May 7, 1991 show the use of volume holograms for polarization separation. However, volume holograms are limited in thickness to approximately 25 microns and this results in beam separations at relatively large angles of 30-45 degrees. While large separations may be desirable for optical filters, smaller beam angle separations are preferred in other applications such as waveplates for optical storage systems, so that the optical sensors may be located close together and preferably in a single package.

Accordingly, what is needed is a volume hologram system which can achieve beam separation at desired angles. A system of this nature would offer the possibility of making holographic optical devices, and particularly waveplates and optical filters at less cost and in potentially large sizes. Additional benefits could be derived from an ability to provide other functions such as modifying beam direction, and a capability of producing a variety of waveplate and optical filter structures exhibiting a wide array of output properties.

SUMMARY OF THE INVENTION

The present invention is directed to a holographic optical system. The holographic optical system includes a volume hologram structure of unique design which offers the advantages of mass reproducibility at low cost and which possesses the capability of providing the functions of a waveplate and an optical filter. In a first aspect of the invention, a volume hologram structure is configured as a waveplate having diffraction characteristics adapted to impart a propagation delay for selected polarization vectors. By controlling the propagation delay and the angle of an incident light beam, an output beam having altered polarization characteristics can be produced. In a further aspect of the invention, a volume hologram structure is configured as a waveplate in conjunction with other optical elements forming an optical storage device. In a still further aspect of the invention, a volume hologram structure is configured as an optical filter for suppressing aliasing imaging artifacts in solid-state optical devices. The blur filter is formed from two volume holograms separated by an optically neutral spacer. The volume holograms have maximum and minimum diffraction efficiencies relative to selected polarization directions of incident radiation for dividing the incident beam into spatially separated component output beams. Alternatively, the blur filter may be constructed so as to be polarization insensitive or color (i.e., wavelength) selective.

BRIEF DESCRIPTION OF THE DRAWINGS

The foregoing and other objects, features and advantages of the invention will be apparent from the following detailed description of an exemplary embodiment thereof, when read in conjunction with the accompanying drawings, in which.

DETAILED DESCRIPTION OF PREFERRED EMBODIMENTS

Figure 1:
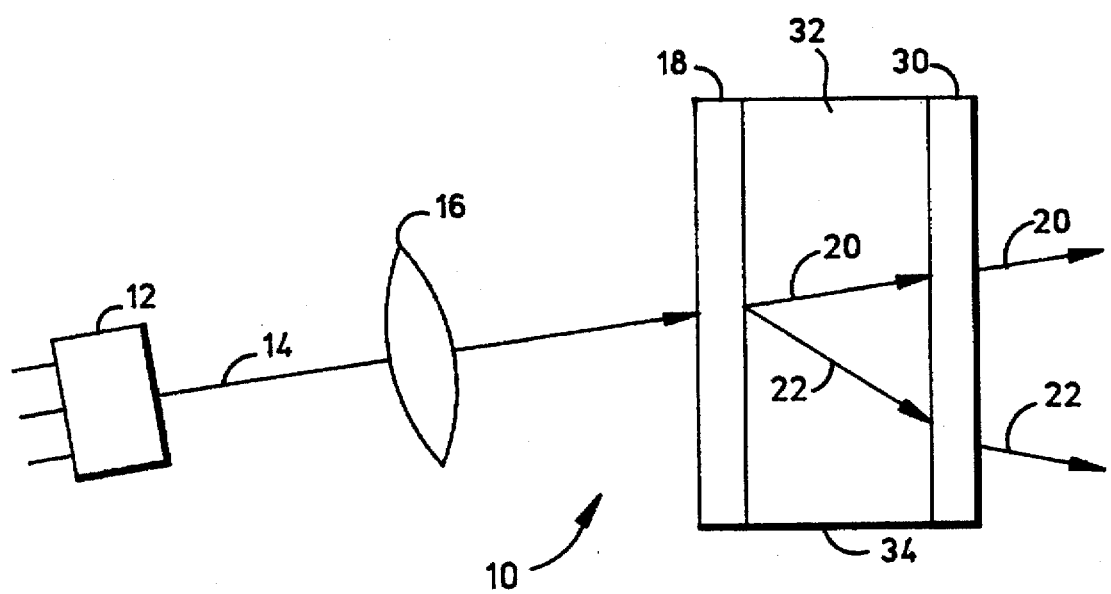
FIG. 1 is a schematic diagram of a holographic optical system of the present invention.

FIG. 1 shows a schematic diagram of a holographic optical system of the present invention and is designated by the general reference number 10. System 10 has a laser diode 12 which produces a light beam 14. Laser diode 12 may be a gallium-aluminum-arsenide laser diode which generates a light beam at approximately 780 nanometers in wavelength. The beam 14 is collimated by a lens 16. Beam 14 then passes to a beamsplitter hologram 18. Beam 14 hits hologram 18 at the Bragg angle of hologram 18. Hologram 18 splits beam 14 into a transmitted beam 20 and a diffracted beam 22. Beams 20 and 22 may have selected power levels and/or polarization percentages.

Beams 20 and 22 pass to a beam directing hologram 30. Beam 22 hits hologram 30 at the Bragg angle of hologram 30 and is diffracted. Beam 20 hits hologram 30 at a non-Bragg angle such that it is transmitted undiffracted. The beam 22 is diffracted to a new desired angle relative to beam 20. Hologram 18 splits the beams 20 and 22 at a highly divergent angle. Hologram 30 is needed to modify the angle between the two beams.

Holograms 18 and 30 are recorded on a substrate 32. Alternatively, holograms 18 and 30 may be recorded on separate substrates and then the substrates may be cemented together. The combination of holograms 18 and 30 and substrate 32 is referred to as a hologram assembly 34.

Figure 2:
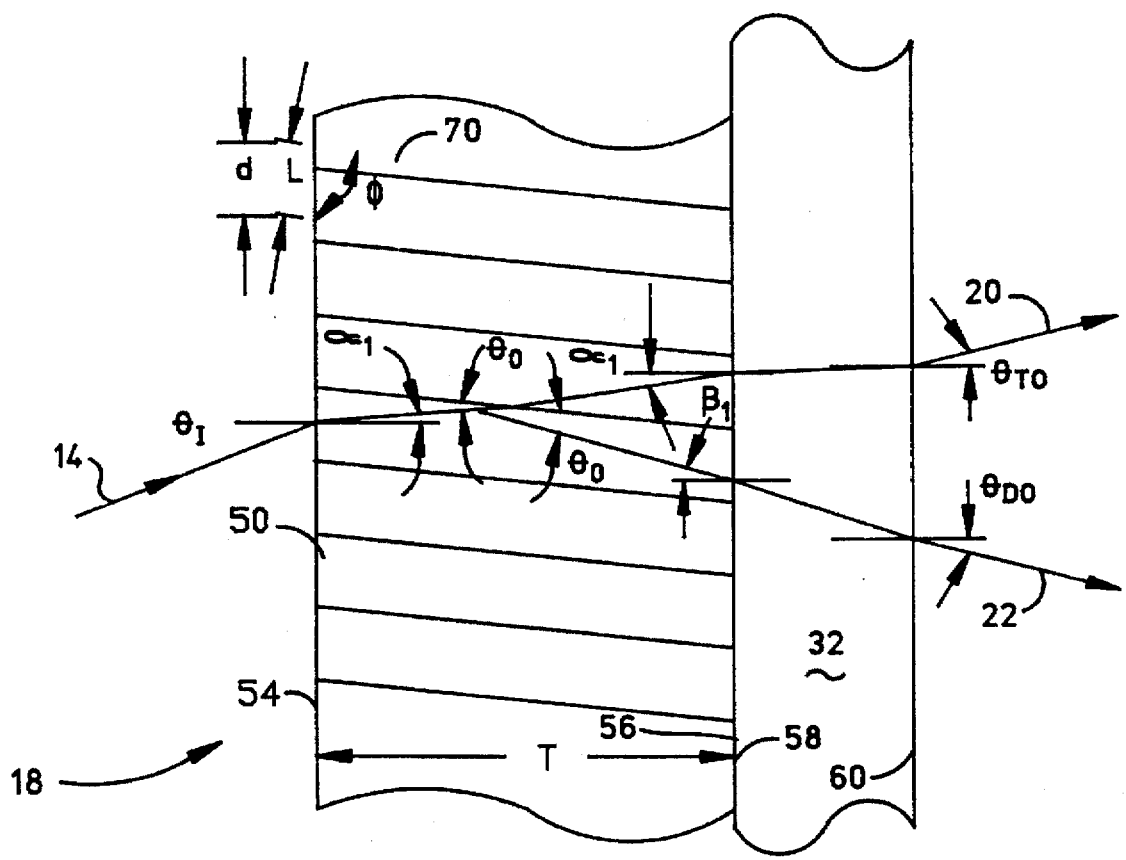
FIG. 2 is a cross sectional view of a volume hologram constructed in accordance with the present invention.

FIG. 2 shows a detailed cross sectional view of hologram 18 in the present invention. Hologram 18 comprises a hologram material 50 deposited to thickness T on substrate 32. The hologram material is preferably dichromated gelatin and the substrate is preferably glass. Hologram material 50 has surfaces 54 and 56, and substrate 32 has surfaces 58 and 60.

The hologram material 50 has been manufactured with periodic Bragg planes 70. The Bragg planes 70 have a separation distance L, an external fringe spacing distance d and an angle $\phi$ relative to surface 54.

In operation, the input beam 14 (having a wavelength $W_1$) enters hologram 18 at surface 54 at an angle $\Theta_I$ with respect to the perpendicular. The beam 14 enters the material 50 at an internal incidence angle $\alpha_1 = \mathrm{asin}\,(\sin\Theta_I/n_0)$ where $n_0$ is the average index of refraction of material 50 (typically 1.26). This change in angle is due to refraction. A portion of beam 14 travels through material 50 without experiencing any diffraction and exits substrate 32 as beam 20. Note that beam 20 experiences refraction at surfaces 56 and 60. This is because material 50, substrate 32, and the surrounding material have different indices of refraction. Beam 20 exits surface 60 at a transmitted output angle of $\Theta_T$. $\Theta_T$ is equal to $\Theta_I$ and beam 20 will appear to be transmitted through hologram 14 without diffraction.

A portion of beam 14 is diffracted by the Bragg planes 70. The angle of beam 14 relative to Bragg plane 70 is the Bragg plane angle $\Theta_O$ and is equal to asin $[W_1/2n_0L]$. The diffracted beam encounters surface 56 at an internal diffraction angle $\beta_1$. The diffracted beam exits substrate 32 at surface 60 as beam 22. Again, there is refraction at surfaces 56 and 60. Beam 22 exits surface 60 at a diffracted output angle of $\Theta_D$. $\Theta_D$, which will be referred to as the external diffraction angle, equals asin $[n_0\sin\beta_1]$. The exact properties of beams 20 and 22 are described in more detail below.

In designing the hologram 18, the following variables are taken into account:

$\Theta_I$=angle of incidence (external).

$\alpha_1$=angle of incidence (internal).

$\beta_1$=angle of diffraction (internal).

$\delta$=deviation from the Bragg angle. Assumed to be equal to zero.

$\phi$=tilt of Bragg planes.

=$\pi/2$ for no tilt.

L=separation of the Bragg planes.

T=thickness of hologram material.

d=external fringe spacing.

$n_0$=average refractive index of the hologram medium, typically 1.26 for an exposed and processed dichromated gelatin holographic grating with high $n_1$.

$n_1$=peak change in index of refraction of the hologram medium. Typically 0.1 for dichromated gelatin.

Wa=wavelength of light in air. Here Wa=$W_1$=780 nm.

$\delta W$=deviation from Wa (Bragg W). Assumed to be equal to zero.

These variables are used in the following formulas:

$\alpha = \mathrm{asin}(\sin[\Theta_I]/n_0)$ (1)

$\phi = (\pi/2)-(\beta-\alpha)/2$ (2)

$\Theta_O = \alpha+(\pi/2)-\phi$ (3)

$L = W_a/(2n_0\sin[\Theta_O])$ (4)

$d = L/\sin(\phi)$ (5)

$C_R = \cos(\alpha)$ (6)

$C_S = \cos(\alpha)-(W_a/n_0L)\cos(\phi)$ (7)

$N = \pi n_1(T/(W_a(C_RC_S)^{1/2}))$ (8)

$\Gamma = 2\pi\delta(\sin[\phi-\Theta_O]/L)-(\delta_W(\pi/n_0L^2))$ (9)

$S = \Gamma(T/2C_S)$ (10)

$E_s = (\sin[(N^2+S^2)^{1/2}])^2/(1+S^2/N^2)$ (11)

$E_p = (\sin((N\cos(2\Theta_O))^2+S^2)^{1/2})^2/(1+S^2/(N\cos(2\Theta_O))^2)$ (12)

Formulas (11) and (12) above give the diffraction efficiencies for the S and P orthogonal polarization components and determine the conditions of the beams 20 and 22. $E_s$ is the diffraction efficiency of the S polarized light component and $E_p$ is the diffraction efficiency of the P polarized light component. The S and P represent the orthogonal polarization components of the light. A more detailed discussion of hologram mathematics is given by Herwig Kogelnik in "Coupled Wave Theory for Thick Hologram Gratings", Bell System Technical Journal, Vol. 48, No. 9, p. 2909 (November 1969).

Figure 3:
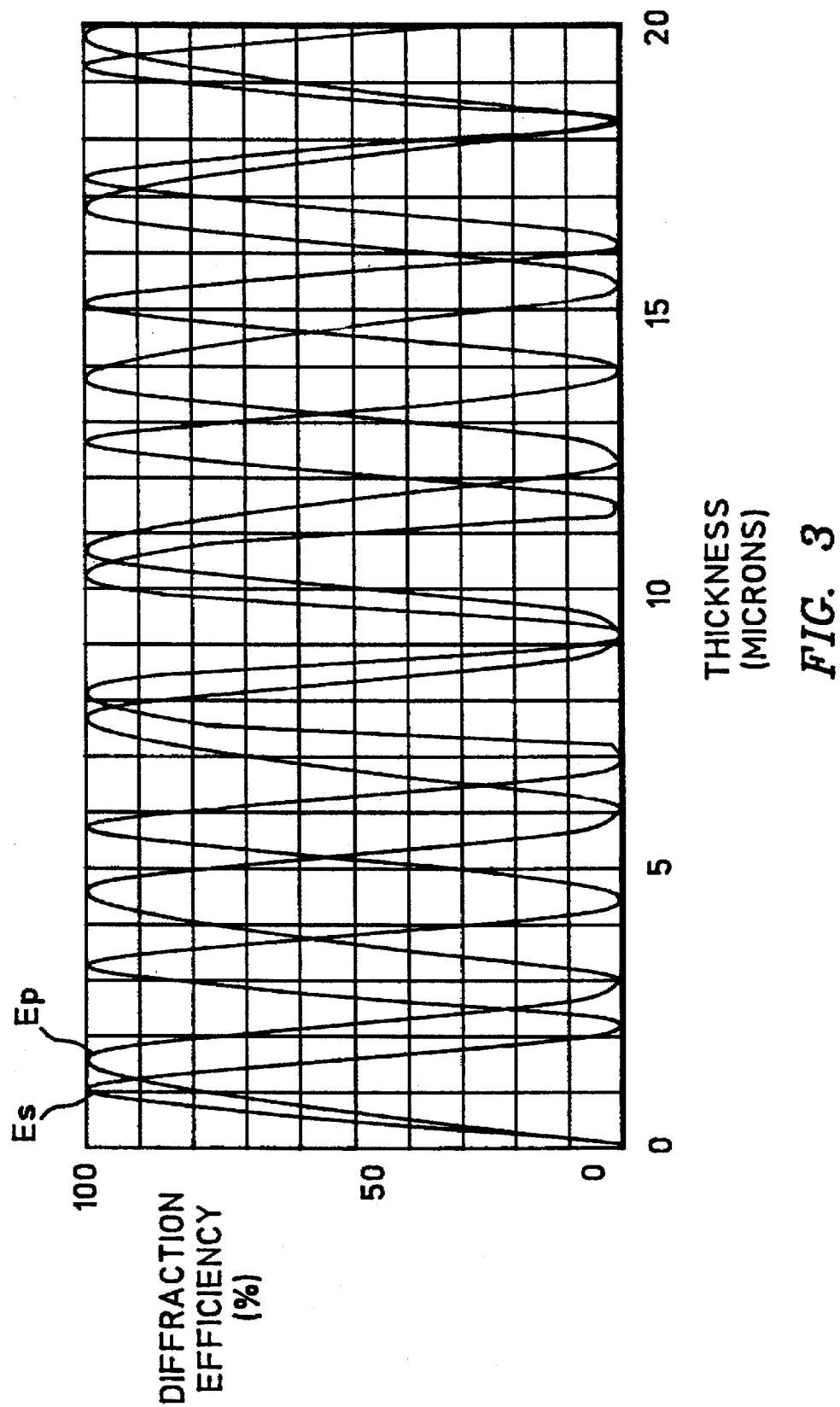
FIG. 3 is a graph illustrating diffraction efficiency versus hologram thickness.

FIG. 3 shows a graph of diffraction efficiency for $E_s$ and $E_p$ versus the thickness T of the material 50 for $\Theta_I=0$ degrees, $\beta_1=41.41$ degrees, $n_0=1.26$, $n_1=0.2$, and $W_a=780$ nm. The diffraction efficiency represents the percentage of beam 14 which will be diffracted as beam 22. The remaining portion of beam 14 will continue as beam 20. For example, at a thickness T equals 4.52 microns, 100 percent of the P polarized light will be diffracted as beam 22 and zero percent of the S polarized light will be diffracted. Beam 22 will have 100 percent P polarized light and zero percent S polarized light while beam 20 will have 100 percent S polarized light and zero percent P polarized light. In such a case, the hologram 18 functions as a polarization beamsplitter.

Beams 20 and 22 may both contain S and P polarization components. For example, at T equals 2.01 microns, beam 22 will have 12 percent of the S polarized light and 75 percent of the P polarized light of beam 14. Beam 20 will have 88 percent of the S polarized light and 25 percent of the P polarized light of beam 14.

If polarization components are not a consideration, hologram 18 may also be used as a variable power beamsplitter. For example, at T equals 5.186 microns, beam 22 will contain 61 percent of the light of beam 14 and beam 20 will contain 39 percent of the light of beam 14. Each beam will then contain equal portions of the two orthogonal polarization components.

In the case of hologram 30, if it is desired to diffract 100 percent of the beam 22 to a desired angle, a thickness which results in 100 percent diffraction of both S and P polarizations is chosen.

It can be seen that by varying the thickness of the hologram, various amounts of beamsplitting and/or polarization separation are possible. Also, by diffracting 100 percent of the beam, angular selection is possible.

In designing the hologram assembly 34, hologram 18 is made such that beam 14 hits hologram 18 at an angle $\Theta_I$ which is the Bragg angle for hologram 18. Hologram 30 is designed such that beam 22 hits hologram 30 at an angle $\Theta_I$ which is the Bragg angle for hologram 30. Beam 20 hits hologram 30 at an angle at which it experiences no diffraction and is transmitted. The exact angles and hologram thickness is determined by using equations (11) and (12) to obtain the desired diffraction efficiency for each beam.

In a first preferred embodiment, holographic optical system 10 acts as a polarization beamsplitter. Beam 20 contains approximately 100 percent of the S-polarization and beam 22 contains approximately 100 percent of the P-polarization of beam 14. Beam 22 exits hologram 30 at an angle of 2.0 degrees relative to beam 20. In this preferred embodiment of assembly 34, for hologram 18, T equals 10.5 μm, $\alpha_1$ equals 3.81 degrees and $\beta_1$ equals 37.47 degrees and $n_1=0.1$. In the case of hologram 30, T equals 10.2 μm, $\alpha_1$ equals 2.22 degrees and $\beta_1$ equals 37.47 degrees and $n_1=0.1$.

Once the thickness T and the desired angles are determined, the hologram is manufactured. In order to record the hologram it is necessary to use a light wave length which will react with the hologram material. In a preferred embodiment, dichromated gelatin is used as the hologram material and a recording wavelength $W_2$ of approximately 488 nanometers is used.

Figure 4:
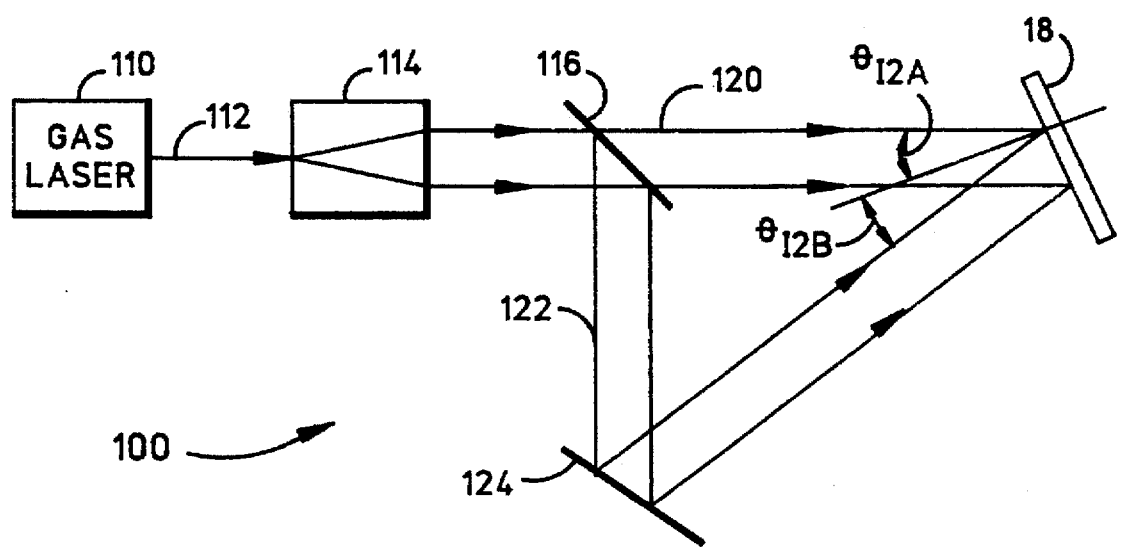
FIG. 4 is a schematic diagram of a system for making the volume holograms in accordance with the present invention.

FIG. 4 shows a schematic diagram of a system for manufacturing the hologram 18 and is designated by the general reference number 100. System 100 has a gas laser 110 which emits a light beam 112 at the recording wavelength $W_2$. Beam 112 is expanded by a beam expander 114. A beamsplitter 116 splits beam 112 into an object beam 120 and a reference beam 122. Beam 122 is reflected by a mirror 124 to hologram 18. Beams 120 and 122 intersect at the hologram 18 at recording external incident angles of $\Theta_{I2A}$ and $\Theta_{I2B}$. The angles $\Theta_{I2A}$ and $\Theta_{I2B}$ are determined by the conditions of the desired hologram (L,φ) as was described above.

The recording angles of incidence are:

$\alpha_{2A}=\phi-\pi/2-\mathrm{asin}(W_2/2n_oL)$ and $\alpha_{2B}=\phi-\pi/2+\mathrm{asin}(W_2/2n_oL)$.

It should be noted that in this equation, $n_0$ is the average refractive index of the unprocessed medium, which, for gelatin, is approximately 1.53. From Snell's Law, $\Theta_{I2A}$=asin $(n_0 \sin\alpha_{2A})$ and $\Theta_{I2B}$=asin$(n_0\sin\alpha_{2B})$. The hologram material 50 of hologram 18 is thereby exposed to light of $W_2$ at angles $\Theta_{I2A}$ and $\Theta_{I2B}$. The result is that the desired Bragg planes are recorded into the film. A similar process is used to make hologram 30.

Figure 5:
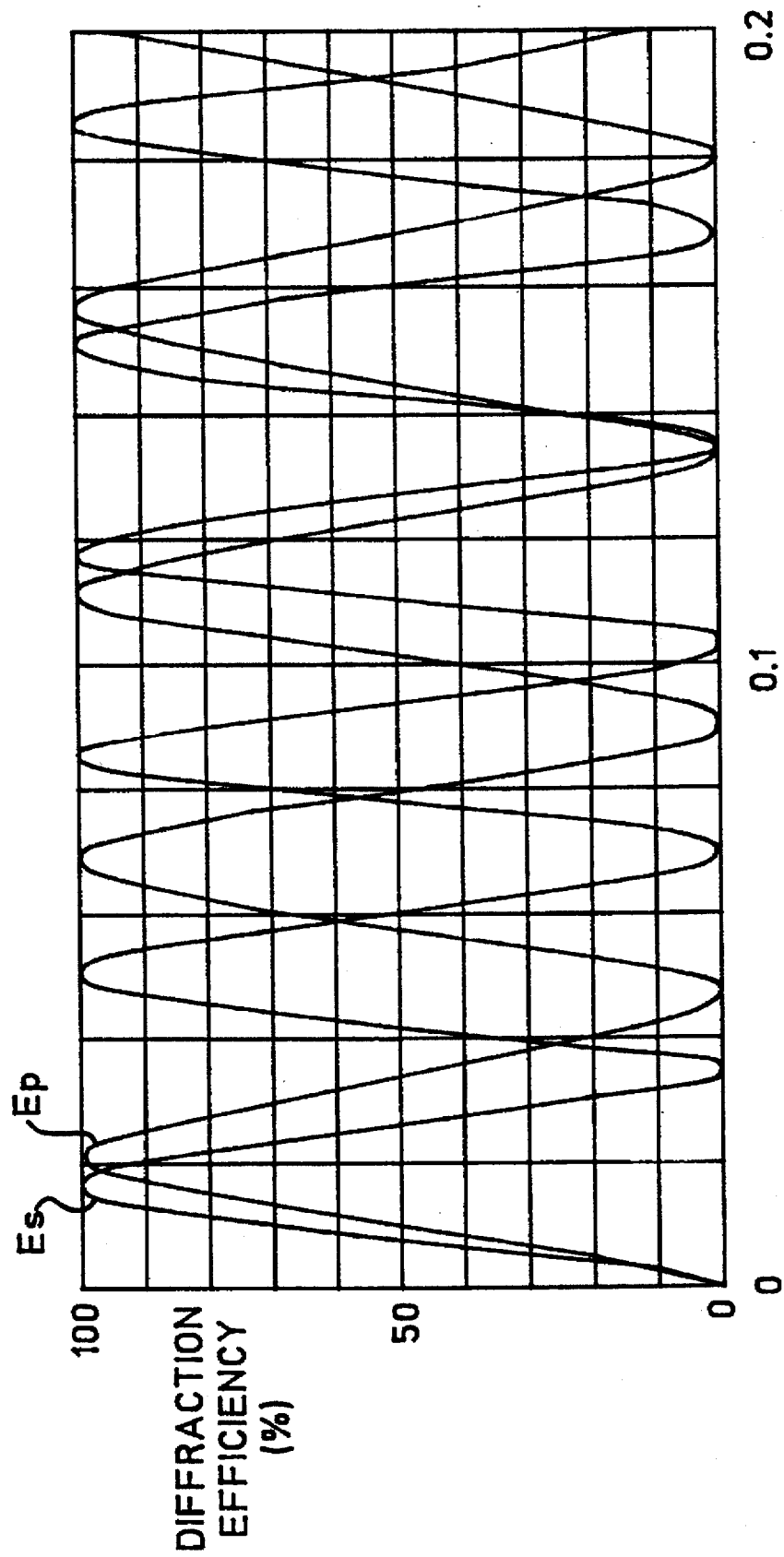
FIG. 5 is a graph illustrating diffraction efficiency versus the peak change in index of refraction of the hologram medium.

FIG. 5 shows a graph of diffraction efficiency versus $n_1$ (peak change in index of refraction of the hologram medium). This graph is for a hologram having a thickness T of 20 microns, $n_0$=1.26, $W_a$=780 nanometers, $\Theta_1$=0 degrees, and $\beta_1$=41.41 degrees. This graph is used to illustrate the fact that the polarization efficiency of the hologram also varies with $n_1$. Therefore, an alternative way to make the holograms of the present invention is to use a standard thickness (T) and then solve equations (11) and (12) by selecting the desired $n_1$. The term $n_1$ depends on the amount of time the hologram is exposed to light during the manufacturing process as described in FIG. 4 and on how the hologram is processed. Therefore, by proper timing of the exposure of the hologram in the process, and by proper processing, the desired properties of the hologram are obtained.

Figure 6:
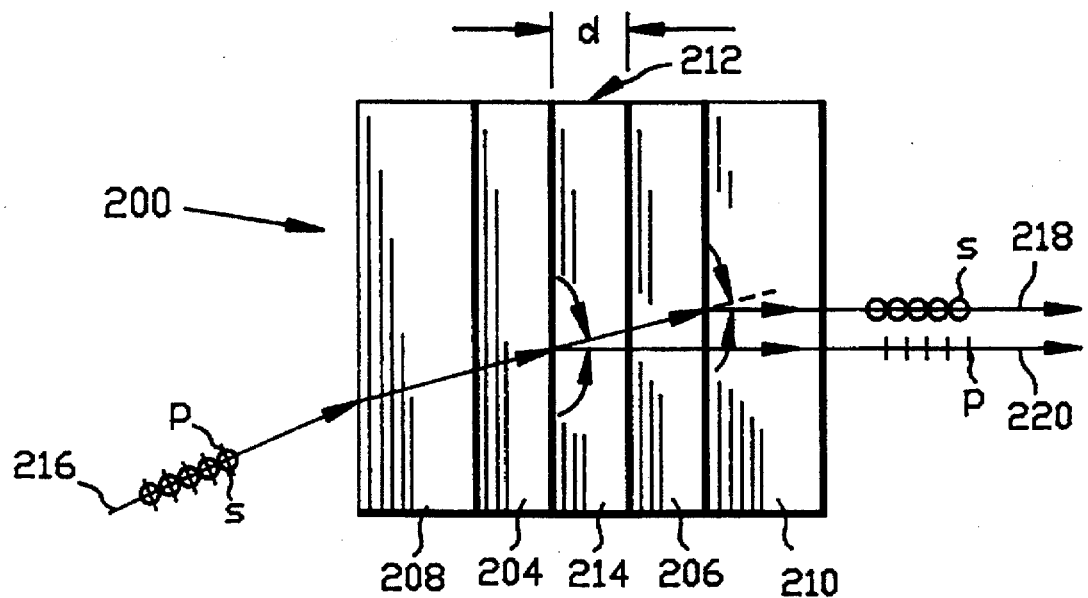
FIG. 6 is a cross sectional view of a first volume hologram waveplate of a holographic optical system constructed in accordance with one aspect of the present invention.

Referring now to FIG. 6, a volume hologram is formed in a second preferred embodiment of the holographic optical system as a holographic waveplate 200. The waveplate 200 includes a pair of holograms 204 and 206 sandwiched together as shown. Each of the holograms 204 and 206 is formed as a transmissive volume hologram using the fabrication techniques illustrated above. The waveplate 200 may be formed from a variety of materials, such as dichromated gelatin or one of the photopolymers available from Dupont Corporation or Polaroid Corporation. Polaroid's DMP-128 is an example. The holograms 204 and 206 are formed using two S-polarized, monochromatic plane waves to generate an interference pattern in the medium in the manner described above. Within the emulsion, a series of parallel crest fringe planes are formed which represent loci of uniform dielectric constant. The fringe pattern produces a diffractive response to coherent illumination, the characteristics of which are described above.

The hologram 204 is formed on a glass substrate 208 while the hologram 206 is formed on a glass substrate 210. Other substrate materials could also be used. The holograms 204 and 206 are separated by a gap 212 filled with a refractive index matching adhesive 214 to eliminate surface reflections. The spacing of the gap 212 will be designated as d, and is actually much smaller than shown, it being understood that FIG. 6 is not to scale. Preferably, the thickness of the two holograms 204 and 206 will be on the order of a few microns or no more than is necessary to achieve adequate polarization separation at each hologram.

It has been shown that the diffraction efficiency of a transmissive volume hologram with respect to S- and P-polarized light varies sinusoidally with changes in either peak modulation of refractive index or hologram thickness. The P-polarization diffraction efficiency, moreover, will lag the S-polarization efficiency. The amount of lag is determined by the angle of incidence and the angle of diffraction. An example of the variation of S and P diffraction efficiencies as a function of emulsion thickness was shown in FIG. 3. By proper selection of emulsion thickness, the hologram 204 can be manufactured to have maximum diffraction efficiency for P-polarized light and minimum diffraction efficiency for S-polarized light. Hologram 206 may be similarly manufactured to have maximum diffraction efficiency for S-polarized light and minimum diffraction efficiency for P-polarized light.

The incident beam 216 is linearly polarized with the polarization direction oriented at an angle of 45 degrees between horizontal and vertical directions in the plane formed by the forward face of the substrate 208. This polarization vector can be resolved into equal components in both the S-polarization direction and the P-polarization direction. At the hologram 204, the P-polarized component of the incident light will be diffracted at an angle σ and the S-polarized light will be unaffected. At the second hologram 206, the S-polarized light will be diffracted, also at the angle σ. As a result, the S-polarized light will travel a slightly greater path length than the P-polarized light in traversing the holographic sandwich. The result will be an output beam containing temporally separated polarization vector components 218 and 220. Although these components are also shown as being spatially separated, the minimal thickness of the holograms 204 and 206 actually produces very negligible spatial separation such that the vector components 218 and 220 combine to provide a single resultant output beam.

The delay in beam propagation through the waveplate 200 may be controlled to provide a selected resultant polarization of the emerging light. For example, if the difference in optical path lengths of the two polarizations is ¼ wavelengths, or n/2+¼ wavelengths, then the emerging light will be circularly polarized. Other amounts of path length difference will produce elliptical polarization or linear polarization with a direction of polarization different than that of the incident light.

To illustrate this point, design calculations are given here for a waveplate 200 that has an optical path length difference of n/2+¼ wavelengths. The parameters are described with reference to FIG. 2 above.

The separation between the holograms 204 and 206 is assumed to be zero, and it is further assumed that diffraction occurs at the entrance surface of each of the holograms. The following values are employed for the parameters of FIG. 2:

$n_0$=1.25

$n_1$=0.2027

$\Theta_f$=33.015 degrees $\delta$=0 degree $\delta_w$=0

$W_a$=780 nm x=9

$\Theta_0$=0.5 acos(x/(x+1))=12.921 degrees

The Bragg plane angle $\Theta_0$ is calculated as 0.5*acos(x/(x+1)), where x is a parameter assuming small positive integer values. These values correspond to the peaks of diffraction efficiency versus T, as may be seen from formulas (11) and (12). In this case, x was taken to be 9. Recall that $n_0$ designates the average refractive index of the hologram material; $n_1$ designates the peak change in this index; $W_a$ denotes the wavelength of incident light, and $\delta$ and $\delta_w$ denote deviations from the Bragg angle and Bragg wavelength, respectively.

The difference $\delta L(T)$ in path length between the P-polarized beams and S-polarized beams is given by $$\delta L(T)=T(n_0((1/\cos(\alpha))-(1/\cos(\beta)))+(\tan(\alpha)+\tan(\beta))*\sin(\Theta_{D0})). \quad (13)$$

Figure 8:
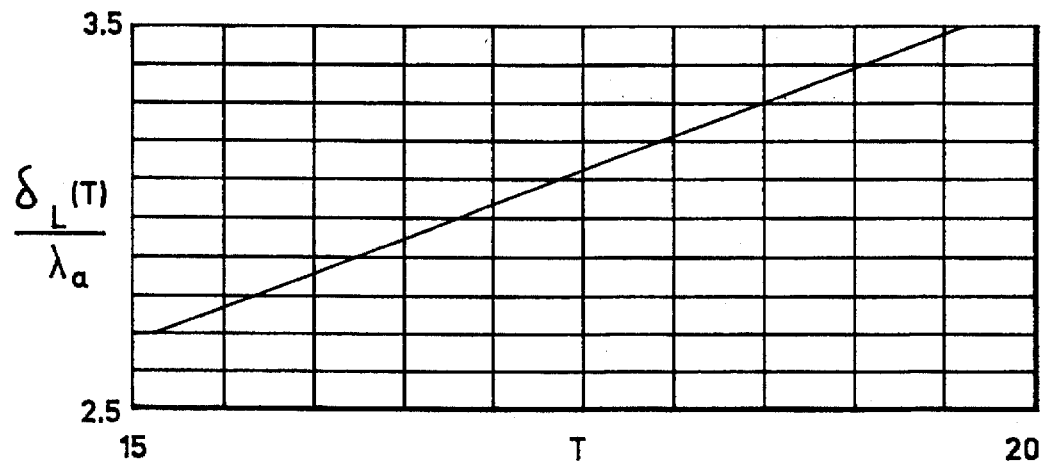
FIG. 8 is a graph illustrating path length difference versus hologram thickness for the volume hologram waveplate of FIG. 6, configured as a quarter waveplate.
Figure 9:
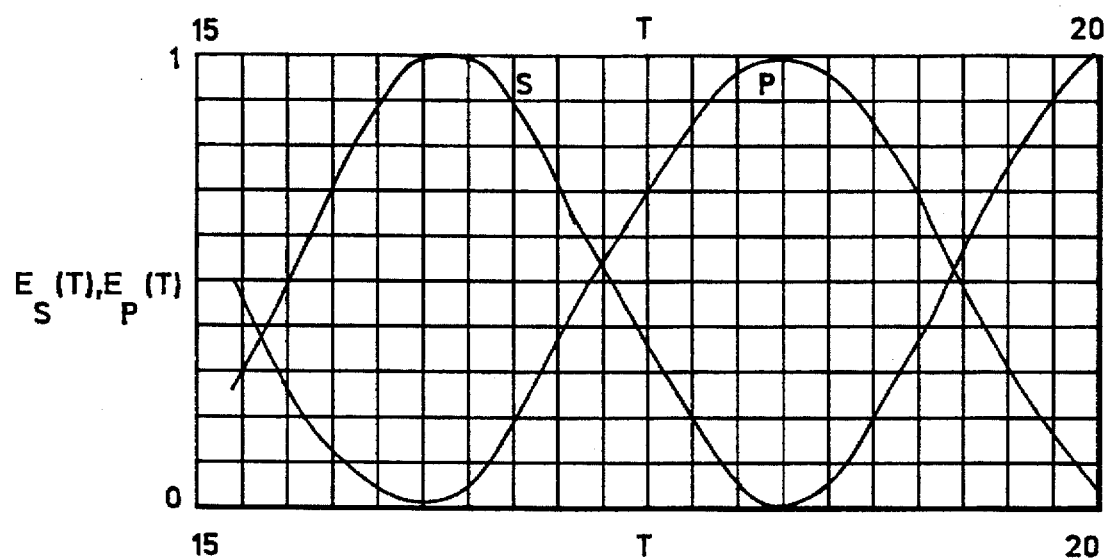
FIG. 9 is a graph illustrating diffraction efficiency versus hologram thickness for the volume hologram waveplate of FIG. 6, configured as a quarter waveplate.

Note that the angles $\alpha$, $\beta$ and $\Theta_{D0}$ are selected to provide substantially parallel output beams 218 and 220. Furthermore, formulas (1)-(12) above may be employed to calculate the diffraction efficiencies $E_s(T)$ and $E_p(T)$ as a function of the hologram thickness T. The results of calculating $\delta L(T)$, $E_s(T)$, and $E_p(T)$ for various values of T are graphed in FIGS. 8 and 9.

Using these graphs it can be determined that for T=18.25 micrometers, $E_s(T)=10^{-6}$, $E_p(T)=1$, and $\delta L(T)/W_a=3.25$. These are suitable values for hologram 204, giving it the desired properties of diffracting only the P-polarization and providing a (n/2+¼) wavelength path difference between the polarization components. Similarly, for T=16.4 micrometers, $E_s(T)=0.999$ and $E_p(T)=0.018$, which are suitable values for hologram 206.

Similarly, design parameters may be calculated which give hologram 200 the behavior of a half-wave plate. The values selected in the preceding calculation are kept, except that the peak variation in refractive index is $n_1=0.141$, the angle of incidence is taken to be $\Theta_I=25$ degrees, and the Bragg plane angle is set at $\Theta_0=16.779$ degrees. Graphs of $E_s(T)$, $E_p(T)$ and $\delta L(T)$ may be made as before. It is determined that for T=15.857 micrometers, $E_s(T)=10^{-5}$, $E_p(T)=1$, and $\delta L(T)/W_a=4.5$, making this a suitable thickness for hologram 204 with half-waveplate behavior. Likewise, for T=13 micrometers, $E_s(T)=0.983$ and $E_p(T)=0.023$, making this T value a suitable thickness for hologram 206.

Figure 7:
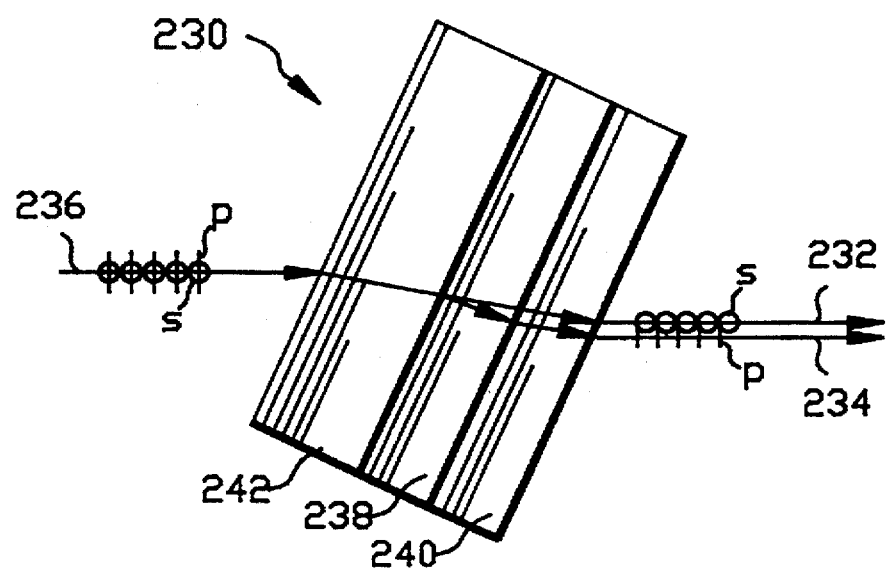
FIG. 7 is a cross sectional view of a second volume hologram waveplate of a holographic optical system constructed in accordance with another aspect of the present invention.

Turning now to FIG. 7, a holographic waveplate 230 constructed in accordance with another aspect of the invention is shown. In this embodiment, an exit beam having S- and P-polarization vector components 232 and 234, respectively, emerges from the waveplate at an angle substantially parallel to the incident beam 236. Again, the angles $\alpha$, $\beta$ and $\Theta_{D0}$ from formula (13) are selected to provide substantially parallel output beams 232 and 234. Unlike the hologram structures 204 and 206, the first and second holograms 238 and 240 are both manufactured to have maximum diffraction efficiency for P-polarized light and minimum diffraction efficiency for S-polarized light. In fact, the two holograms, in this case, are identical in all respects. This pair of holograms will also provide a path difference between S- and P-polarized light of 3.25 wavelengths for an angle of incidence of 45 degrees and a hologram thickness of 3.659 microns for each hologram. The holograms 238 and 240 are both formed on a single substrate 242, illustrating an alternative embodiment, although the construction of FIG. 6, in which each hologram is formed on a separate substrate, is more preferred.

Figure 10:
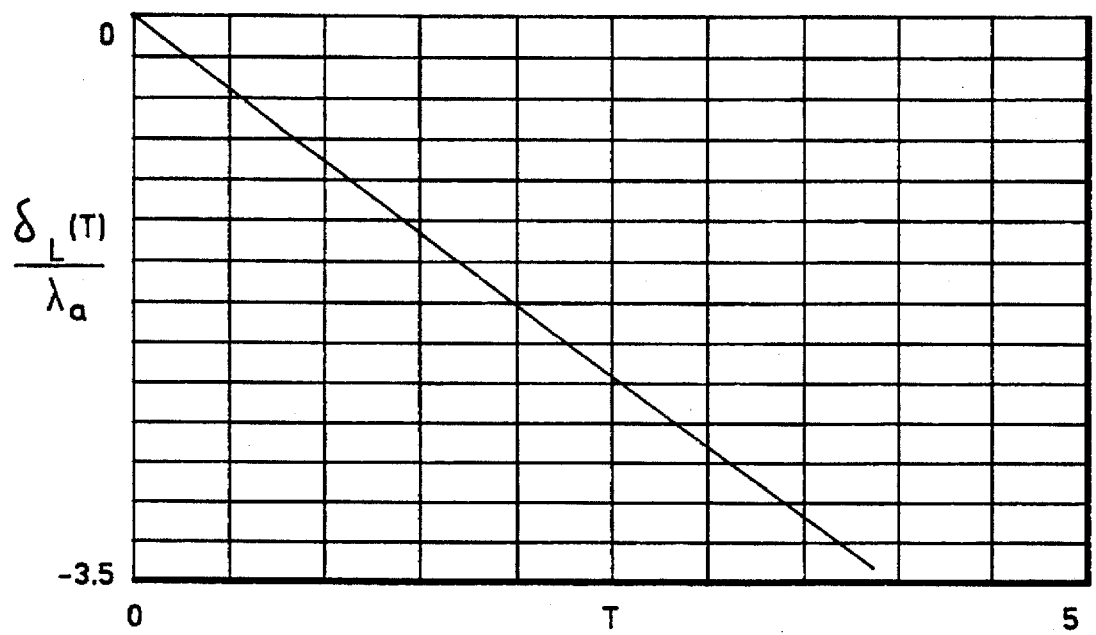
FIG. 10 is a graph illustrating path length difference versus hologram thickness for the volume hologram waveplate of FIG. 7, configured as a quarter waveplate.
Figure 11:
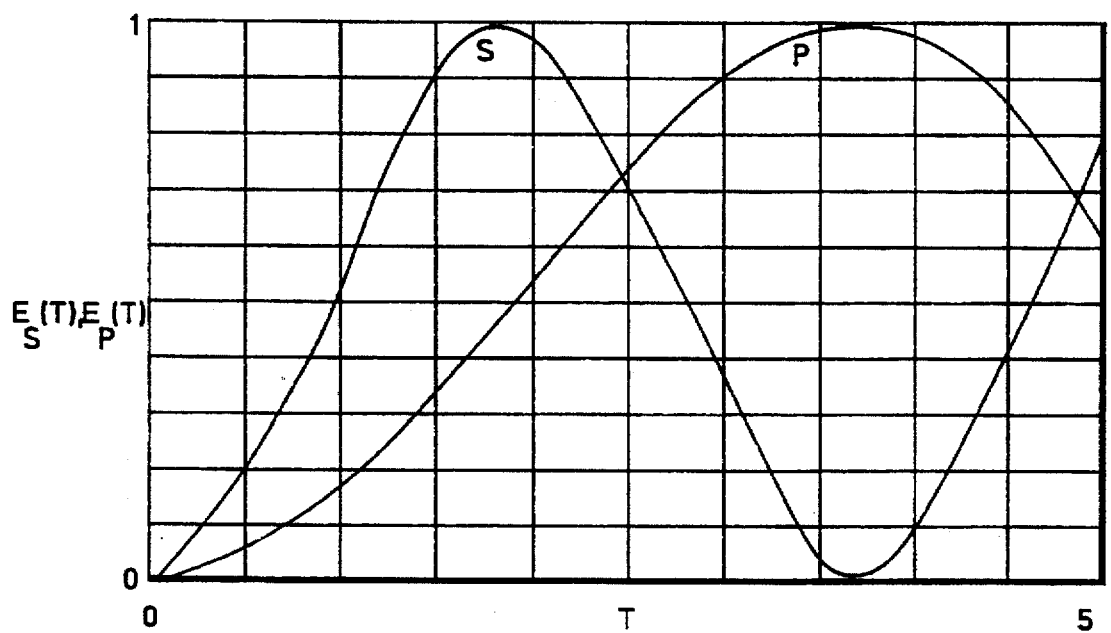
FIG. 11 is a graph illustrating diffraction efficiency versus hologram thickness for the volume hologram waveplate of FIG. 7, configured as a quarter waveplate.

The design of hologram 230 is similar to that just described for hologram 200. The following values are employed for the parameters:

$n_0=1.25$ $n_1=0.183$ $\Theta_I=45$ degrees $\delta=0$ degree $\delta_w=0$ $W_a=780$ nm $x=1$ $\Theta_0=0.5 \; \mathrm{acos}(x/(x+1))=30$ degrees The value $\delta L(T)$ is calculated using formula (13), and $E_s(T)$ and $E_p(T)$ using formulas (1)-(12) as above. The results are plotted in FIGS. 10 and 11, from which it can be determined that for T=3.659:

$E_s(T)=2.214*10^{-4}$; $E_p(T)=1$; $\delta_L(T)/W_a=3.25$.

These values are suitable for a quarter waveplate.

Similar calculations may be made for a half-waveplate version of hologram 230 which, again, is made by changing the peak variation in refractive index $n_1$. The following values were employed for the parameters:

$n_0=1.25$ $n_1=0.171$ $\Theta_I=45$ degrees $\delta=0$ degree $\delta_w=0$ $W_a=780$ nm $x=1$ $\Theta_0=0.5 \; \mathrm{acos}(x/(x+1))=30$ degrees The value $\delta L(T)$ is calculated using formula (13), and $E_s(T)$ and $E_p(T)$ using formulas (1)-(12) as above. It can be determined that for T=3.941:

$E_s(T)=2.772*10^{-5}$; $E_p(T)=1$; $\delta_L(T)/W_a=-3.5$.

These values are suitable for a half-waveplate.

Figure 12:
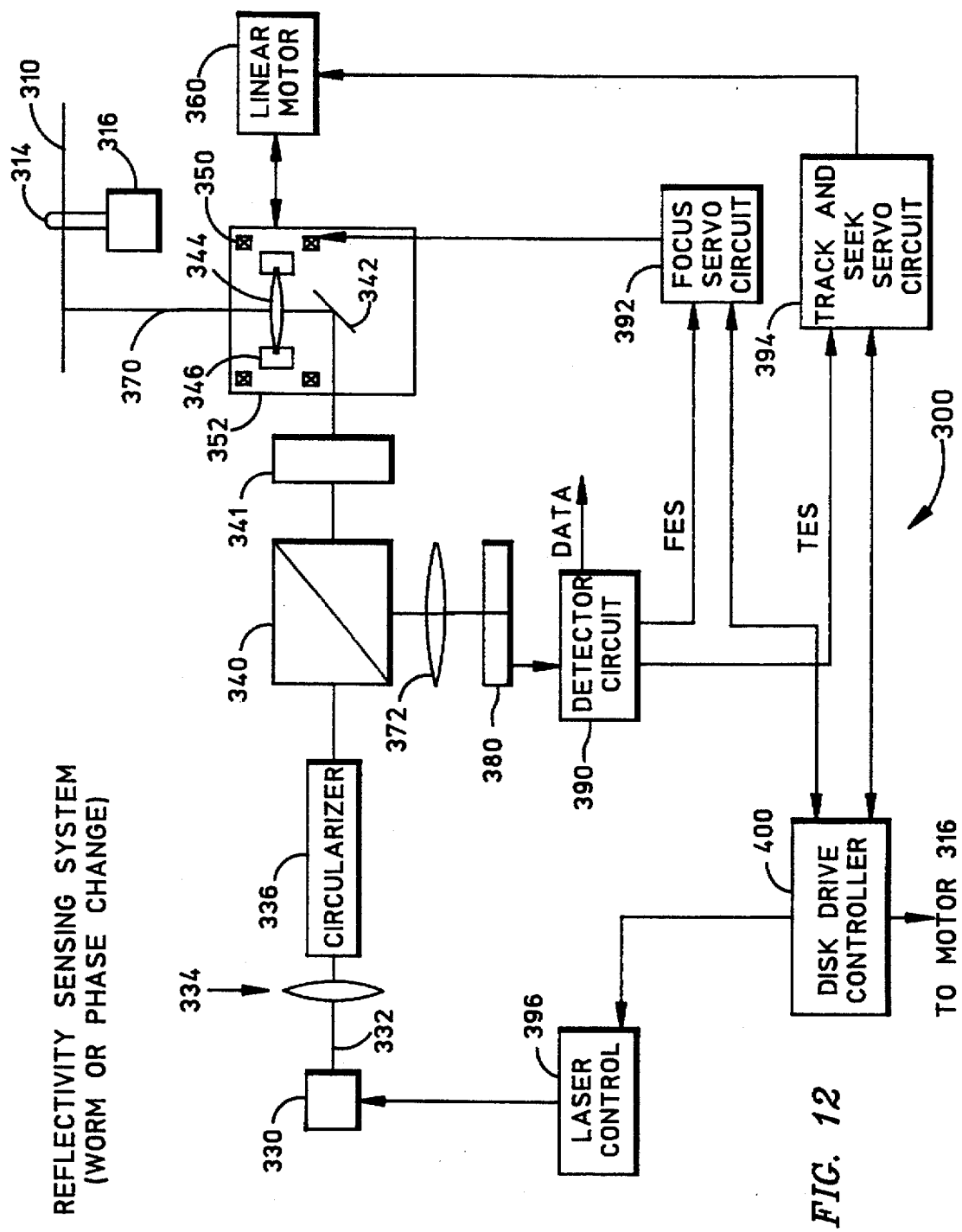
FIG. 12 is a schematic diagram of a holographic optical system of the present invention configured as an optical data storage system.

The holographic optical system of the present invention may be advantageously configured for optical data storage. FIG. 12 shows a schematic diagram of a holographic optical system for optical data storage and is designated by the general reference number 300. System 300 includes an optical data storage medium 310 which is preferably disk-shaped. Medium 310 is designed for a data recording technique that allows data readout by sensing reflectance change, e.g. write-once read-many (WORM) or phase change media. Medium 310 is removably mounted to a clamping spindle 314 as is known in the art. Spindle 314 is attached to a spindle motor 316. Motor 316 rotates spindle 314 and medium 310.

A laser 330 generates a light beam 332. Laser 330 may be a gallium-aluminum-arsenide diode laser which produces light at approximately 780 nm in wavelength. Beam 332 is collimated by a lens 334 and is provided with a circular cross-sectional beam pattern by a circularizer 336. Circularizer 336 may be a circularizing prism. Beam 332 passes through a beamsplitter 340 and a quarter waveplate 341, which is preferably constructed as a holographic waveplate such as the waveplates 200 and 230 shown in FIGS. 6 and 7. The beam 332 is then reflected by a mirror 342 to a lens 344. Lens 344 focuses beam 332 to medium 310. Lens 334 is mounted to a lens holder 346. Holder 346 may be moved up or down relative to medium 310 by a focus actuator motor 350 which may be voice coil motor.

Mirror 342, lens 344, holder 346 and motor 350 comprise an optical head 352. Head 352 may be moved in a radial direction relative to medium 310 by a linear motor 360.

A portion of beam 332 is reflected by medium 310 as beam 370. Beam 370 passes through lens 344 and is reflected by mirror 342 to the quarter waveplate 341. At beamsplitter 340, beam 370 is reflected to lens 372, which focuses the beam on the segmented optical detector 380. The six outputs of detector 380 feed into detector circuit 390, which generates a data signal, a focus error signal (FES) and a tracking error signal (TES). A focus servo 392 is connected to circuit 390 and to motor 350. A track and seek servo 394 is connected to detector circuit 390 and to linear motor 360. A laser control 396 is connected to and provides power to laser 330. A disk drive controller 400 is connected to and controls motor 316, servos 392 and 394, and laser control 396. Servos 392 and 394, and laser control 396, and controller 400 are all known in the art.

Figure 13:
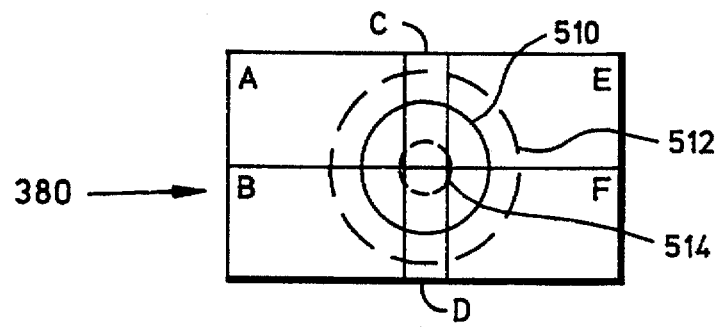
FIG. 13 is a top view of an optical detector in the holographic optical system of FIG. 12.

FIG. 13 shows a top view of detector 380. The detector 380 is divided into six sections 380 A, B, C, D, E and F.

Figure 14:
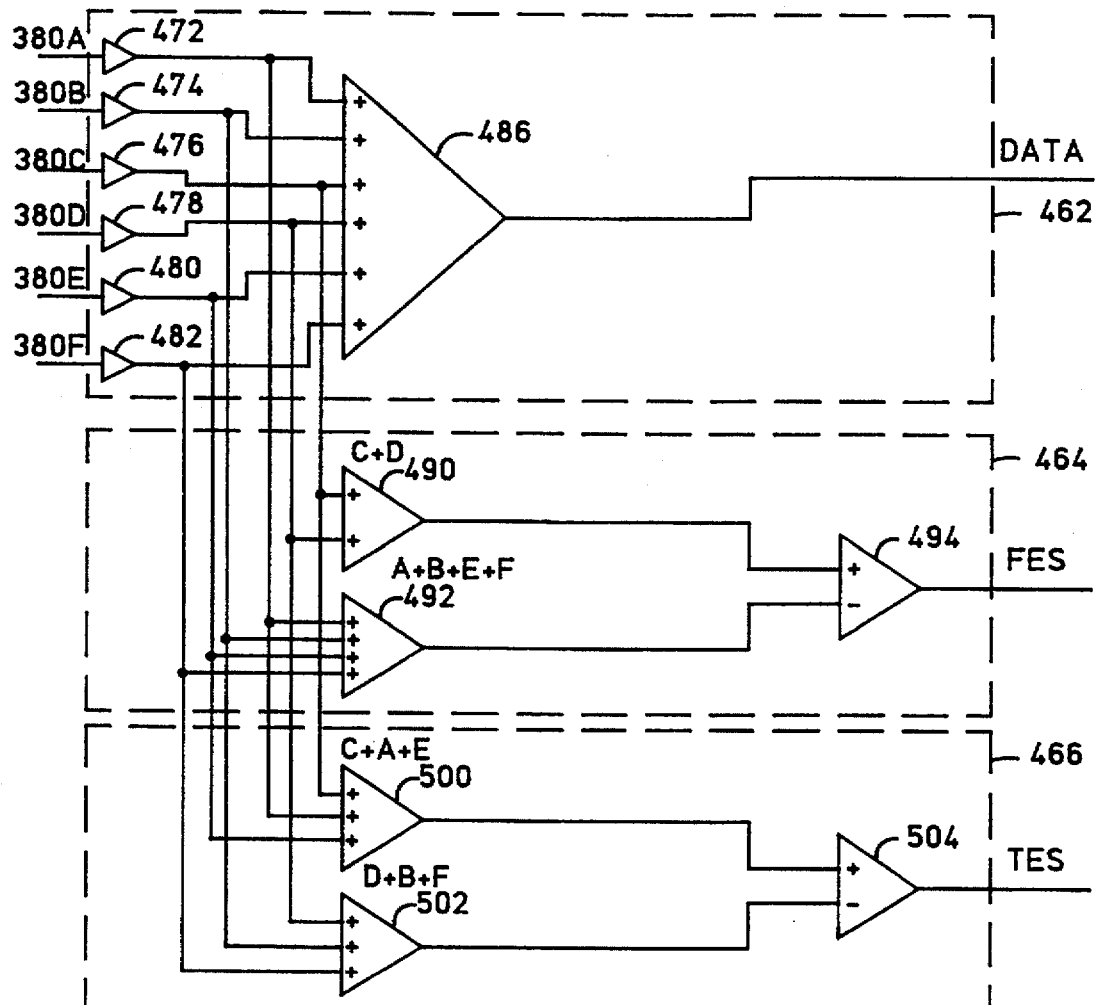
FIG. 14 is a circuit diagram for the holographic optical system of FIG. 12.

FIG. 14 shows a circuit diagram of a detector circuit 390. Circuit 390 comprises a data circuit 462, a focus error circuit 464, and a tracking error circuit 466. Data circuit 462 has a plurality of amplifiers 472, 474, 476, 478, 480 and 482 connected to optical detector segments 380 A, B, C, D, E and F, respectively. Amplifiers 472–482 are connected to a summing amplifier 486. The output of amplifier 486 is the data signal.

The focus error circuit 464 comprises a pair of summing amplifiers 490 and 492, and differential amplifier 494. Amplifier 490 is connected to amplifiers 476 and 478. Amplifier 492 is connected to amplifiers 472, 474, 480 and 482. Amplifiers 490 and 492 are connected to differential amplifier 494 and the output of amplifier 494 is the focus error signal (FES).

Tracking error circuit 466 comprises a pair of summing amplifiers 500 and 502, and differential amplifier 504. Amplifier 500 is connected to amplifiers 472, 476 and 480. Amplifier 502 is connected to amplifiers 474, 478 and 482. Amplifier 504 is connected to amplifiers 500 and 502 and generates a tracking error signal (TES).

The operation of holographic optical system 300 may now be understood. When it is desired to write data onto medium 310, laser 330 is turned on, producing a write beam 332 which is of sufficient intensity to heat spots on medium 310 in a way that provokes a stable alteration in their reflectivity. Laser 330 is controlled to provide a pulsed beam 332 representative of the data to be recorded. The data is thus recorded as spots on medium 310.

During the read operation, reflected beam 370 returns to beamsplitter 340. The quarter waveplate 341 provides optical isolation and minimizes the intensity of the beam returning to the laser 330, as is conventionally known. When beam 332 is exactly focussed on medium 310, beam 370 will have a circular cross-section 510 on detector 380. The amount of light hitting areas C and D will be approximately equal to the amount of light hitting areas A, B, E and F, and will cause circuit 462 to generate a zero focus error signal. If beam 332 is slightly out of focus one way or the other, beam 372 will fall as a circular cross-section 512 or 514 on detector 380. This will cause circuit 464 to generate a negative or positive focus error signal. The focus error signal is used to control motor 350 to move lens 344 until the focus is again achieved.

If beam 332 is focused exactly on a track of medium 310, then beam 372 will fall as a circular cross-section 510 equally between the sections A, C and E, and the sections B, D and F. If beam 332 is off track it will fall more on sections A, C and E, and less on sections B, D and F, or visa versa. This will result in a positive or negative tracking error signal being produced by circuit 390. This tracking error signal is then used to control motor 360 to move head 352 until the beam is once again on track.

Figure 15:
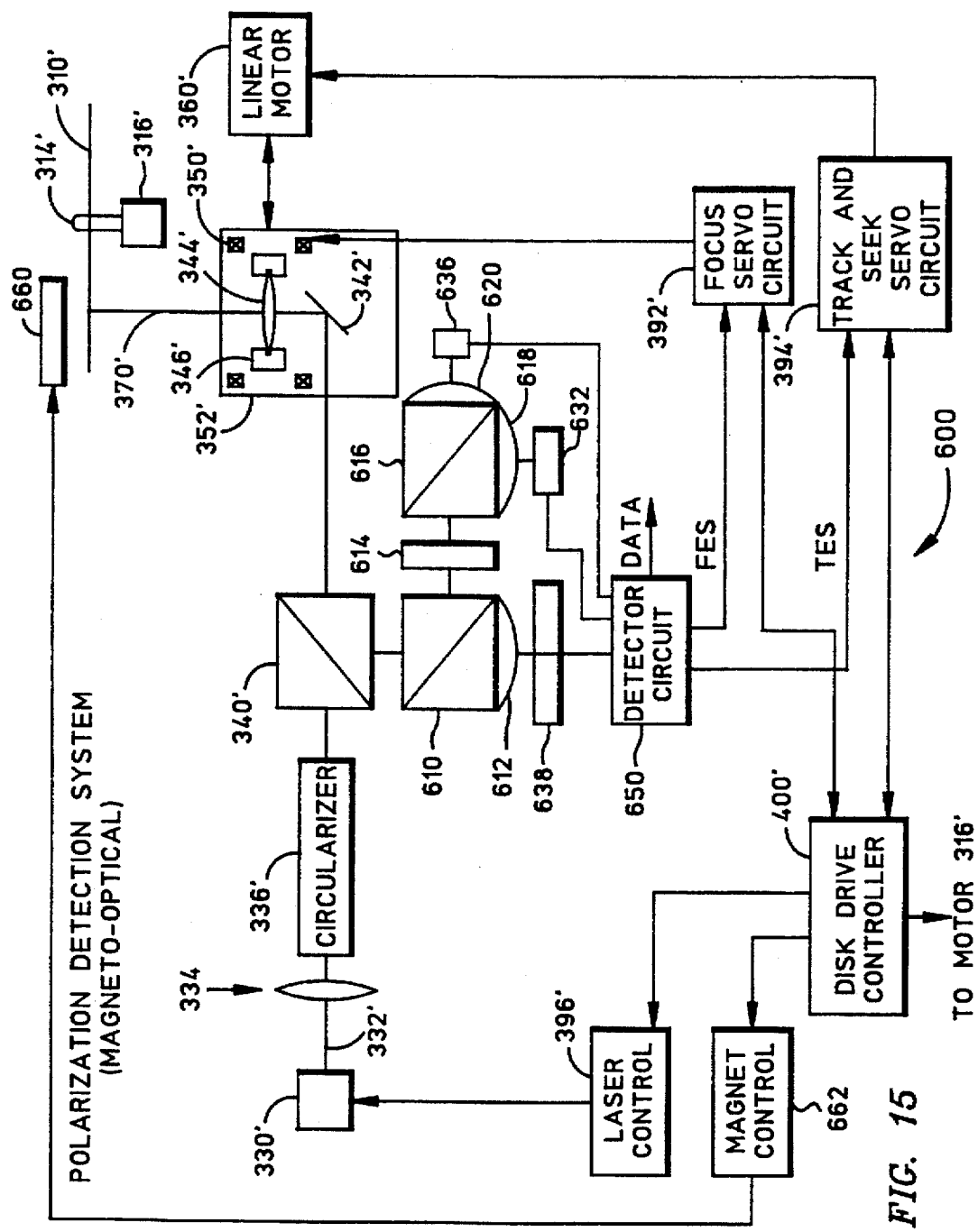
FIG. 15 is a schematic diagram of a holographic optical system configured as an alternative optical data storage system.

FIG. 15 shows a schematic diagram of an alternative embodiment of a holographic optical system for optical data storage and is designated by the general reference number 600. Elements of system 600 which are similar to elements of system 300 are designated by a prime number. In system 600, the recording medium 310' is a magneto-optical medium from which data are read out by sensing magnetization orientation. Data are written by heating spots in the medium above its Curie temperature by means of laser beam 332', in the presence of a magnetic field created by magnet 660 under the direction of magnet control 662.

In the system of FIG. 15, the beamsplitter 340' is polarization selective, so that it produces a linearly polarized beam to mirror 342'. Approximately 70% of the intensity polarized in the plane of the paper is transmitted to the medium 310'. The portion of beam 332' which is reflected by medium 310' has its polarization rotated because of the Kerr effect. The reflected beam 370', after passing through lens 344' and being reflected by mirror 342', is split by leaky polarization beamsplitter 340', one of whose output beams goes to an amplitude beamsplitter 610. Beamsplitter 340' has reflectivities of $R_p$ greater than zero and $R_s$ approximately equal to 1 where s and p represent the orthogonal polarization components of the light.

One output beam from beamsplitter 610 is focused by a lens 612 on a segmented detector 638 for focus and tracking error detection, whereas the other output beam passes to waveplate assembly 614, which is constructed to be a half-wave retarder. The waveplate 614 is rotated so the plane of polarization of the beam emerging from the waveplate is 22.5° with respect to the plane of the paper in FIG. 15. The medium 310' has recorded spots having either an up or down magnetic domain. The light reflected off of these spots have their plane of polarization rotated one way or another depending upon the direction of the magnetic domain of the spot. Beamsplitter 616 separates the reflected light depending upon which way the plane of polarization has been rotated. The separated beams are focused through lenses 618 and 620 to respective single optical detectors 632 and 636 for detecting the data signal. The outputs of the three optical detectors 632, 638 and 636 are connected into the detector circuit 650.

Figure 16:
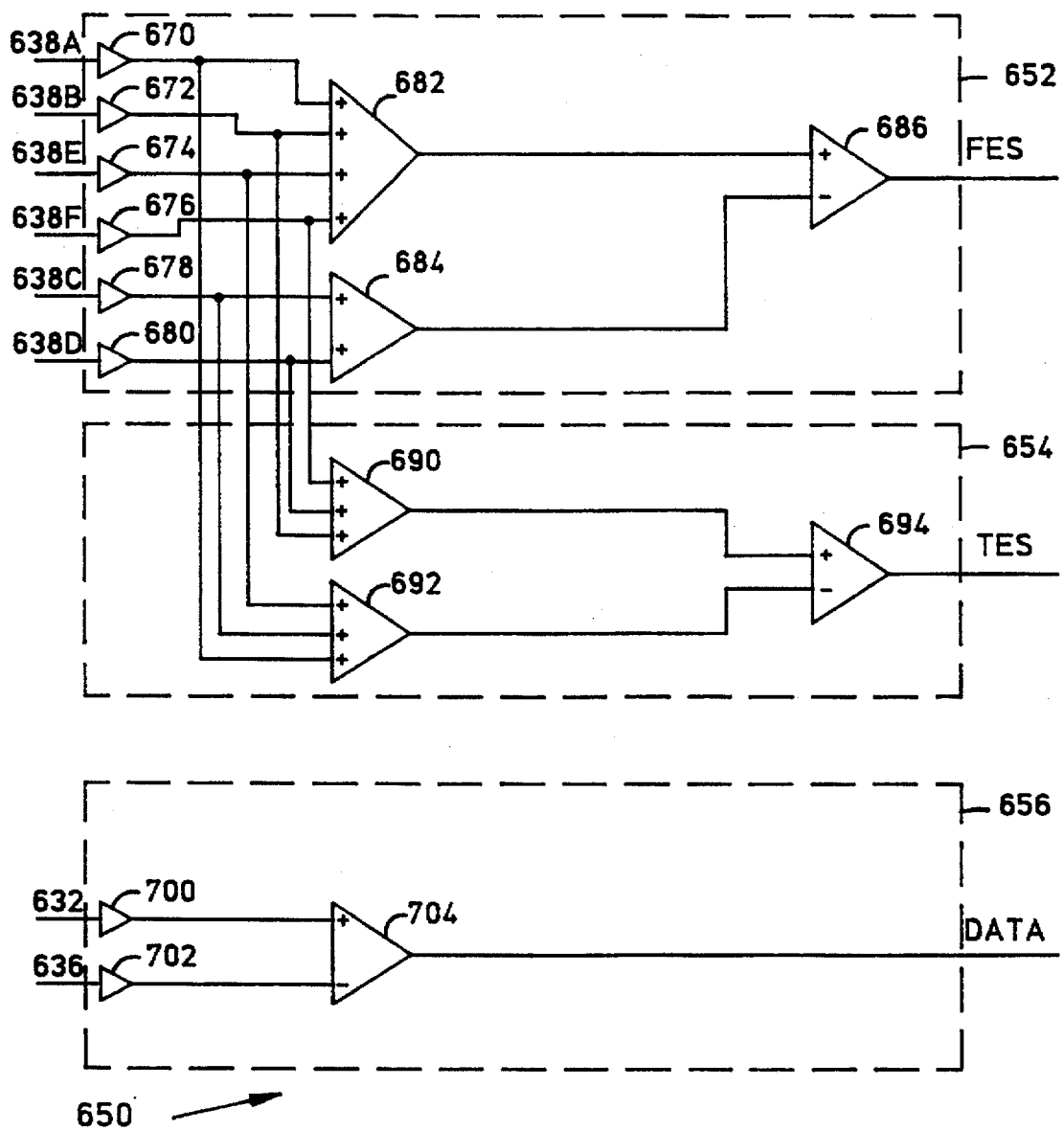
FIG. 16 is a circuit diagram for the holographic optical system of FIG. 15.

FIG. 16 shows a circuit diagram of the detector circuit 650. Circuit 650 is comprised of a FES circuit 652, a TES circuit 654, and a data circuit 656. Circuit 652 comprises a plurality of amplifiers 670–680, a pair of summing amplifiers 682 and 684, and a differential amplifier 686. Circuit 654 comprises a pair of summing amplifiers 690 and 692, and differential amplifier 644. Circuit 656 comprises a pair of amplifiers 700 and 702, and differential amplifier 704. Amplifier 700 is adjusted relative to amplifier 702 in order to compensate for differences in intensity caused by beamsplitter 616.

Figure 17:
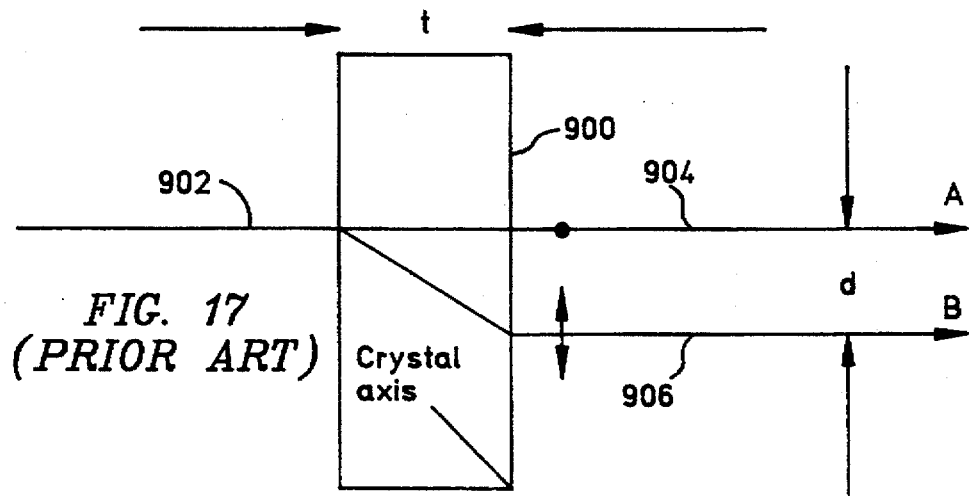
FIG. 17 is a schematic diagram of a prior art birefringent blur filter.
Figure 18:
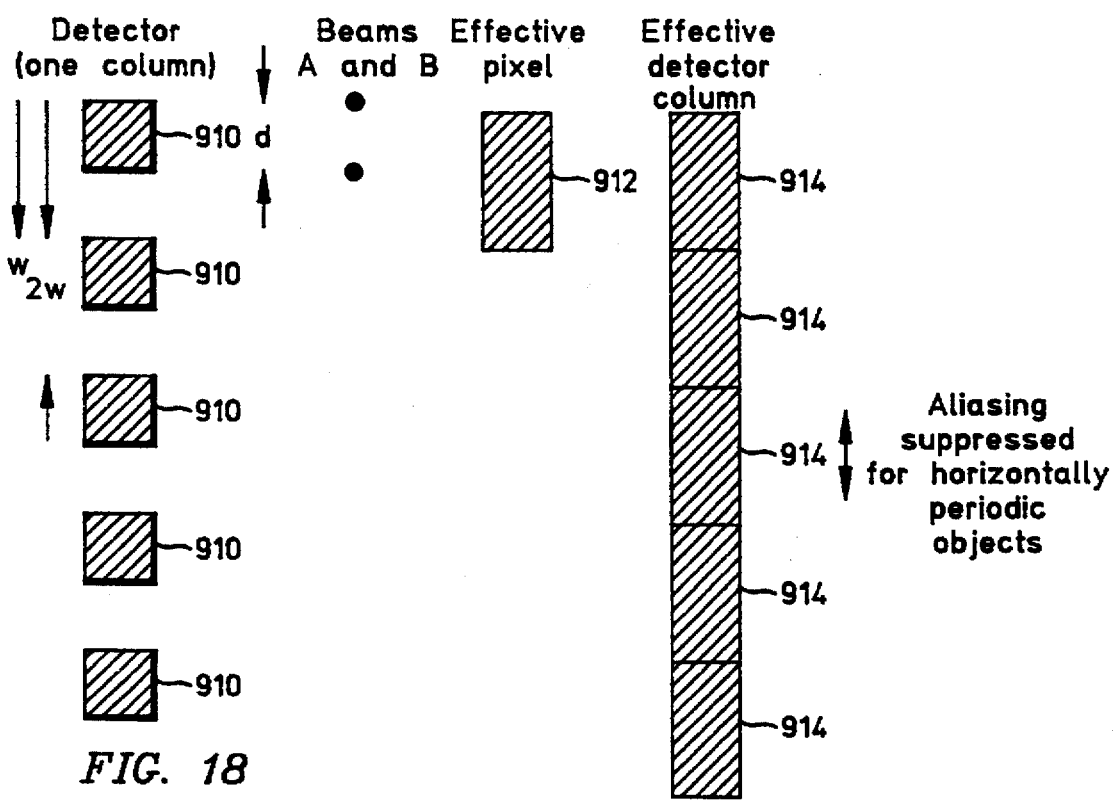
FIG. 18 is a diagrammatic representation of detector elements in a video cassette camera.
Figure 19:
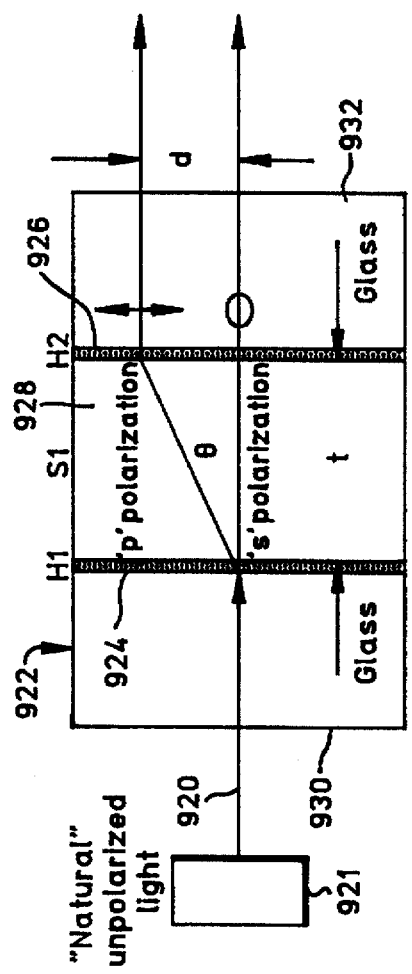
FIG. 19 is a cross sectional view of a first volume hologram blur filter of a holographic optical system of the present invention.

Referring now to FIGS. 17–19, a further preferred embodiment will be described representing another application for polarization separation using a holographic optical system. In this application, volume holograms are used in reducing aliased imaging-artifacts in solid-state cameras such as video-cassette cameras. Video-cassette cameras use solid-state detectors such as charge-coupled devices. These detectors are mosaics of small individual detectors. The pixel size and shape depends on the detector and its application. For black and white imaging, a typical pixel size is 11.5 micrometers square, and a typical detector spacing is 23 micrometers. Birefringent filters are used to selectively blur the image presented to the detector in order to suppress aliasing effects (see J. E. Greivenkamp, "Color dependent optical prefilter for the suppression of aliasing artifacts", Applied Optics, Vol. 29, pp. 676–684 (1990)).

The design of a prior art birefringent blur filter is shown in FIG. 17. The birefringent plate 900 splits the incident light 902 into two beams 904 and 906. The portion of the beam 902 polarized perpendicular to the crystal axis of the plate is undeviated and is transmitted through (A). The remainder of the beam is refracted at both interfaces (B). The deviation distance d depends on the type of birefringent material, the angle the crystal axis makes to the surface interfaces and the thickness of the plate. A 2 mm thick natural quartz plate cut with its crystal axis at 45 degrees will produce a 12 micrometer separation between the orthogonally polarized beams A and B. This filter is placed immediately in front of the detector. When a single birefringent filter is used, aliasing in one-dimension is suppressed. Aliasing in both dimensions can be suppressed by stacking two birefringent plates rotated with respect to each other.

The goal of a blur filter is to make the effective detector width equal to the detector spacing. FIG. 18 shows a line of square pixel elements with width w and spacing 2 w. To make the effective detector width equal the detector spacing, the deviation distance d should equal w. In this case, the blur filter effectively doubles the width of the detector in the vertical direction to form an effective pixel 912 and effective detector column 914. Adding such a blur filter to a two-dimensional array of pixels would suppress aliasing effects from horizontal periodic objects.

Polarization separating holograms can be used as aliasing suppression filters. FIG. 19 shows a preferred embodiment of a volume hologram blur filter for a holographic optical system of the present invention. An unpolarized light beam 920 is provided from an arrangement 921 of conventional image forming lenses as found, for example, in a video camera. The lens arrangement 921 serves as a radiation source of the light beam 920 to a holographic blur filter 922. The light beam 920 is incident normal to the holographic blur filter 922 which includes a pair of volume holograms 924 and 926 separated by a spacer layer 928 of thickness dimension t and sandwiched between a pair of glass plates 930 and 932. Hologram 924 transmits without deviation the incident light which is polarized parallel to the Bragg planes in the hologram (S polarization). However, hologram 924 diffracts by an angle Θ the light which is polarized perpendicular to the Bragg planes (P polarization). The diffracted and undiffracted light pass through the spacer layer 928 with thickness $T_g$ and strike the second hologram 926. The hologram 926 is identical in optical performance to the hologram 924. The hologram 926 transmits without deviation the S-polarized light and diffracts the P-polarized light so that it is parallel to the S-polarized light. The displacement between the two beams is $d=T_g(\tan \Theta)$. Alternatively, the hologram 926 could be designed to transmit the P-polarized light and diffract the S-polarized light.

It can be seen that the holographic blur filter in FIG. 19 performs the same function as the conventional birefringent blur filter in FIG. 17. However, the birefringent blur filter shown in FIG. 17 produces two spots with separation that is normally independent of the wavelength of illumination. The holographic blur filter is wavelength dependent. The diffraction angle changes with wavelength in accordance with the relationship $\sin\Theta=W/p$ where W is the operating wavelength and p is the grating pitch. This implies the change in spot separation versus W is $$\delta d/\delta W = T_g((\tan\Theta/W) + (\tan^2\Theta/p\cos\Theta))$$

where Θ is the nominal diffraction angle at W. Also, S and P polarization diffraction efficiency is wavelength dependent. As the wavelength changes from the design wavelength, the S diffraction efficiency goes up and the P diffraction efficiency goes down.

A holographic blur filter may be constructed for use with a monochrome (black and white) detector. The center of the wavelength response of the detector is assumed to be 550 nm. The detector pixels are 11.5 micrometer square and spaced 23 micrometers apart. The structure as designed for this detector is shown in FIG. 19 where 924 and 926 are holograms 10 micrometers thick. Spacer layer 928 is 9.6 micrometers thick. The blur spot separation d is 11.5 micrometers. The P diffraction efficiency is 100% for 550 nm incident light and drops to 50% at wavelengths +/−105 nm. The S diffraction efficiency is 0% for 550 nm incident light and rises to 2% at wavelengths +/−105 nm. The spot separation at 445 nm is 8.8 micrometers. The spot separation at 655 nm is 15 micrometers. Thus, if this filter is used with a wavelength range of 445 nm to 655 nm, the blur spot due to chromatic aberrations would be 6.2 micrometers. Filters with a smaller efficiency bandwidth are possible. A reduced efficiency bandwidth would reduce the size of the chromatic blur.

The design calculations for holograms 922 and 924 employed the following parameters, referring to FIG. 2:

$n_0=1.25$ $n_1=0.151$ $\Theta_f=0$ degrees $\delta=0$ degrees $\delta_w=0$ $W_a=0.550$ x=5 (3rd peak of polarization efficiency curve)

$\Theta_0=0.5 \, \mathrm{acos}(x/(x+1))=16.779$ degrees

Figure 20:
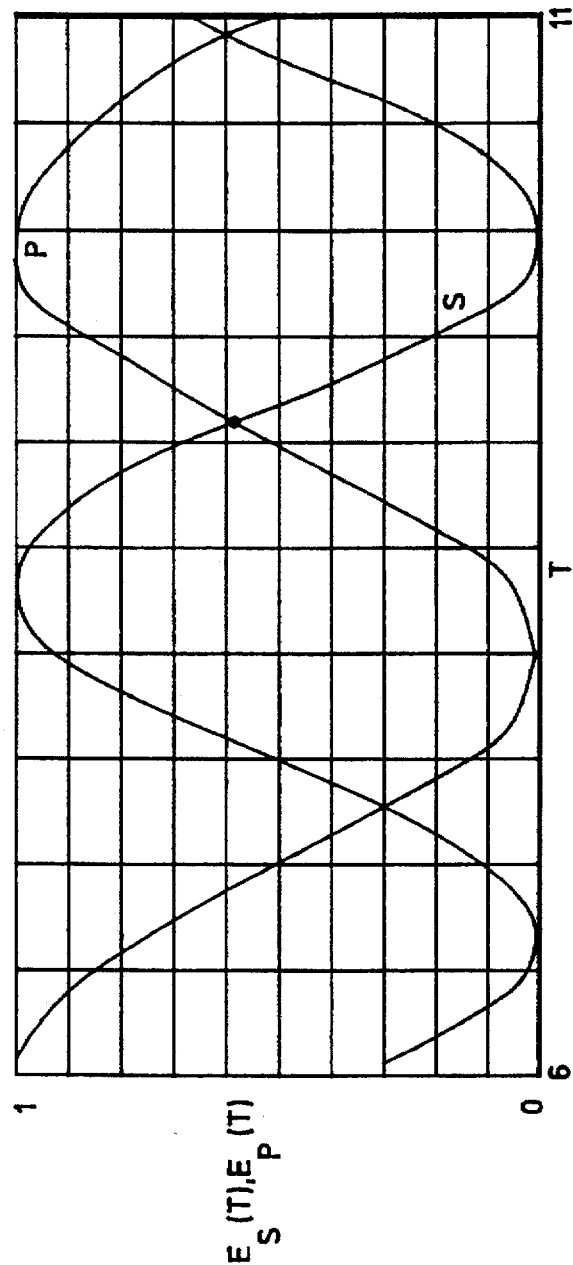
FIG. 20 is a graph illustrating diffraction efficiency versus hologram thickness for the blur filter of FIG. 19.

FIG. 20 is a graph of the relationship between Es(T), Ep(T) and hologram thickness, calculated as before employing equations (1)–(12). For T=10 micrometers, Es(T)= $5.543*10^{-4}$, Ep(T)=1 so T is a suitable hologram thickness.

In order to calculate the thickness of the gelatin spacer layer 928, it is assumed that its refractive index $n_g=1.53$. It is also assumed that the P-polarized beam is diffracted twice and the S-polarized beam is not diffracted at all (holograms 924 and 926 are identical). The value $d=D(T_g)$ is the lateral separation of the two beams, normal to the propagation direction of the beams. It is related to the spacer thickness $T_g$ by the following equation (including the separation due to the hologram gelatin and assuming the case where the angle of incidence is zero degrees):

$$D(T_g)=T_g(\tan\Theta_d)+T(\tan\beta)$$

Figure 21:
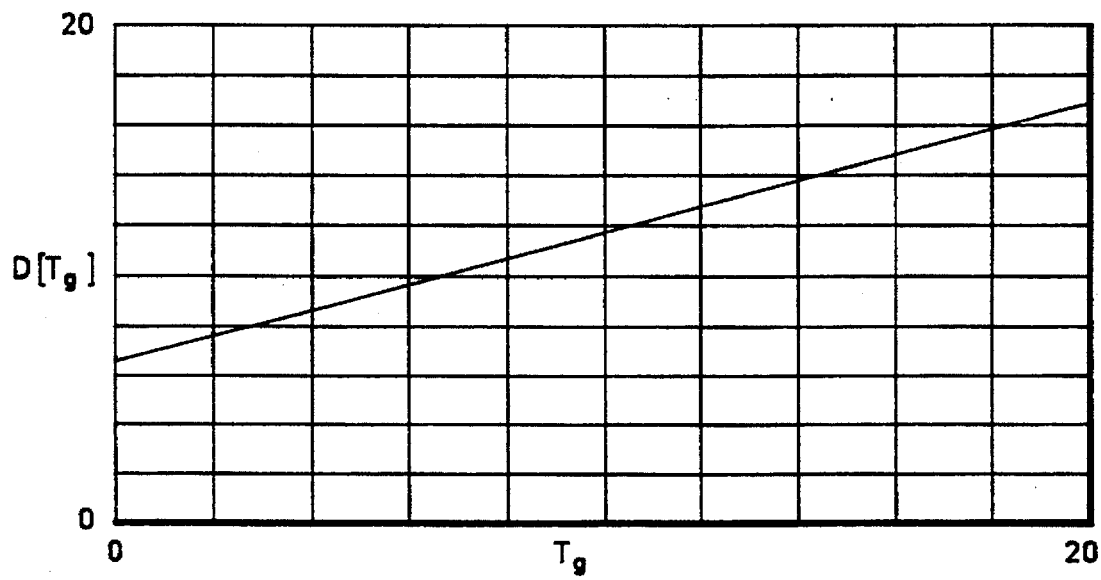
FIG. 21 is a graph illustrating lateral beam separation versus hologram thickness for the blur filter of FIG. 19.

FIG. 21 is a graph of spot separation $D(T_g)$ versus the thickness of the gelatin spacer layer 928 between the two holograms. It is seen that the thickness of the holograms provides only a small addition to the separation. The thick layer of gelatin separating holograms 924 and 926 is required to provide the relatively large lateral separation of the two beams (25 to 50 microns) needed for the blur filter. It is seen from the graph that for $T_g=9.62$, $D(T_g)=11.503$ providing the necessary 11.5 micrometer spacing.

Figure 22:
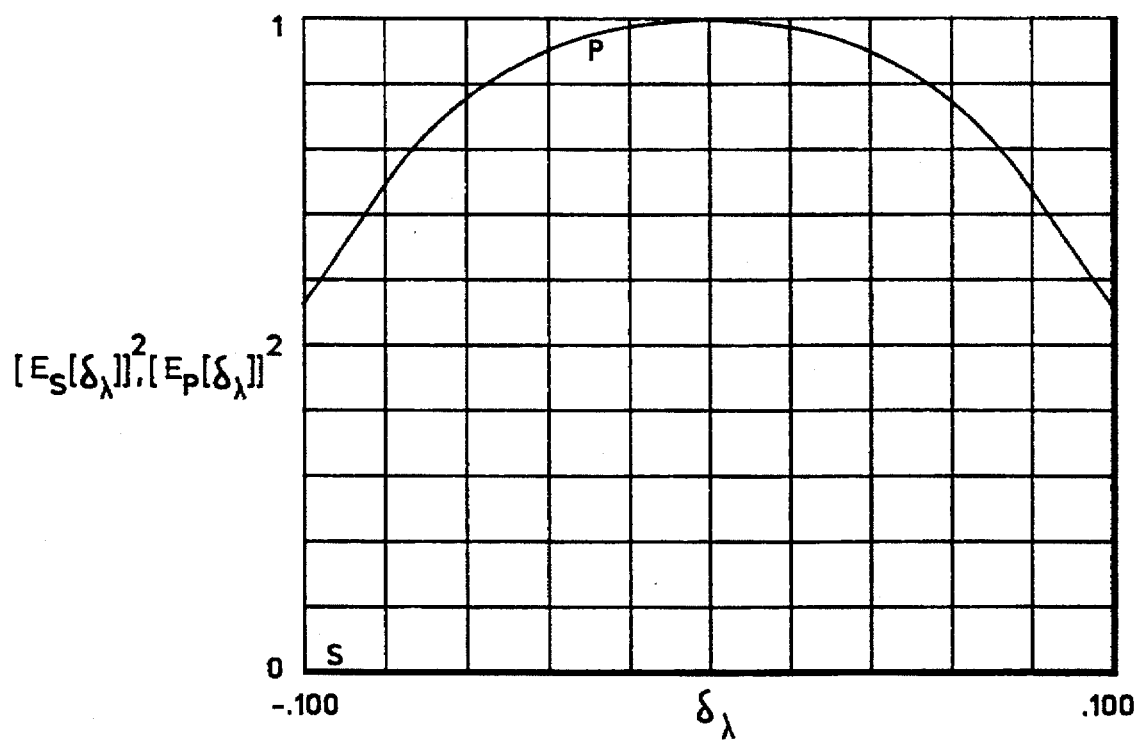
FIG. 22 is a graph illustrating diffraction efficiency versus deviation from the optimum Bragg angle wavelength for the blur filter of FIG. 19.

Using equations (1)–(12) above it is also possible to calculate the S and P diffraction efficiencies as a function of the wavelength deviation from the optimum Bragg angle wavelength. The results of this calculation are graphed in FIG. 22. δW, the deviation from the optimum Bragg angle wavelength, was varied in steps of 0.005 microns, and hologram thickness T was taken at its design value of 10 micrometers. By extending the graph of FIG. 22, it is seen that for $\delta_w=0.105$, $E_s(\delta_w)^2=0.021$, $E_p(\delta_w)^2=0.495$.

Figure 23:
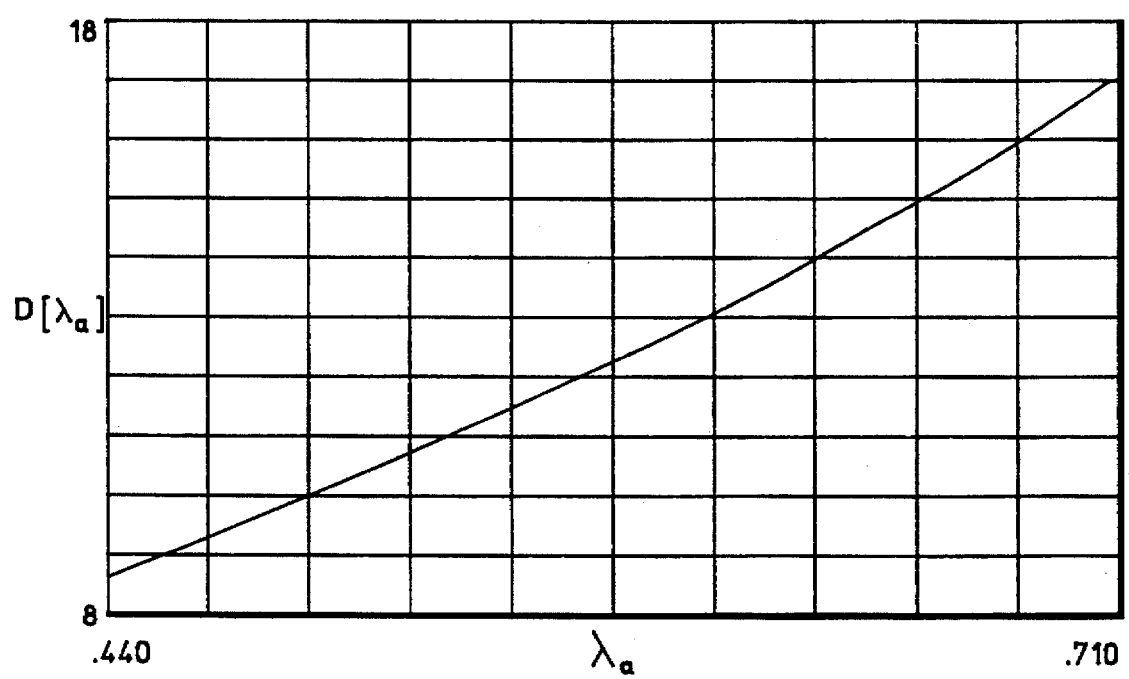
FIG. 23 is a graph illustrating lateral beam separation versus wavelength for the blur filter of FIG. 19.

It is also possible to compute the spot separation D as a function of the nominal beam wavelength. It is related to wavelength $W_a$ by the following equation (ignoring the separation due to the hologram gelatin and assuming that the angle of incidence is zero degrees):

$$D=(T_g\tan\beta_2+T\tan\beta_1)$$

where $\beta_1$ and $\beta_2$ are the internal diffraction angles for the first and second holograms 922 and 924, respectively. The variation of D with wavelength is graphed in FIG. 23. At the spacer layer design thickness of $T_g=9.62$ micrometers, we have:

$W_a$=0.445, D=8.77
$W_a$=0.550, D=11.503
$W_a$=0.710, D=17.088

The holographic blur filter is fabricated as follows. Dichromated gelatin (DCG) is deposited using standard techniques on a 1 mm thick glass substrate. A hologram is exposed in the DCG. Hologram construction is done at 488 nm. This wavelength is different from the operating wavelength (550 nm) so the hologram construction angles necessary will be non-normal in order for the hologram to operate with 550 nm light at normal incidence. The reference beam is collimated and incident 7.2 degrees from the surface normal. The object beam is 47.6 degrees from the surface normal. Both the reference and object beams are incident on the same side of the surface normal. The exposed hologram is processed using known techniques. The final thickness of this layer should be 10 micrometers. Next a layer of unadulterated gelatin is deposited on top of the processed hologram 924. This neutral gelatin is dried. The final thickness of the neutral gelatin should be 9.6 micrometers. Next, hologram 926 is fabricated in an identical fashion to hologram 924 on a separate substrate. The two substrates are sandwiched together using a UV-curable epoxy with their Bragg planes parallel.

The conventional birefringent blur filter produces two spatially separated beams which are orthogonally polarized. One beam is polarized perpendicular to the optical axis of the birefringent material, and the second beam is polarized perpendicular to the first beam. In some circumstances, the incoming light may itself be linearly polarized, which might result in one or another of these two beams containing little light. Under these conditions, the anti-aliasing properties of the conventional blur filter are reduced or eliminated.

Figure 24:
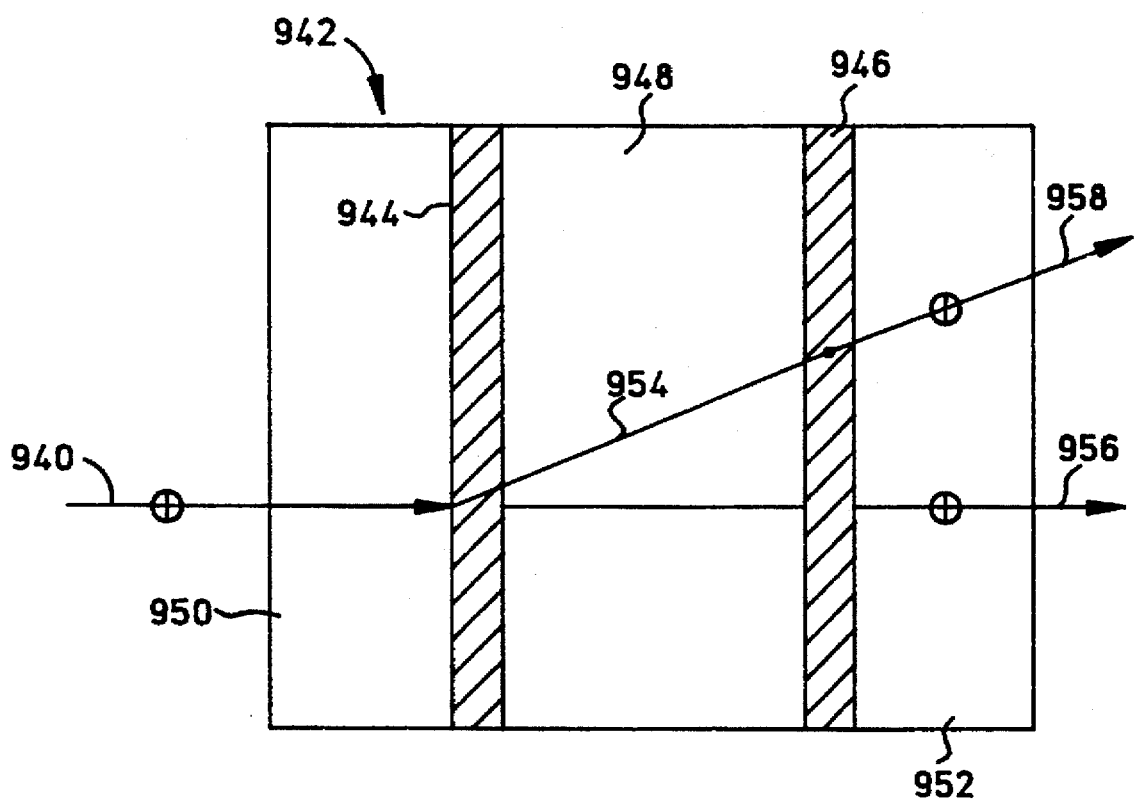
FIG. 24 is a cross-sectional view of a second volume hologram blur filter of a holographic optical system of the present invention.

An additional embodiment of the holographic blur filter eliminates this sensitivity to incident polarization. In this embodiment depicted in FIG. 24, a polarized light beam 940 is incident on a holographic blur filter 942. The blur filter is made up of two holograms 944 and 946, separated by a neutral gelatin spacer layer 948. Hologram 944 is designed to diffract 50% of both the incident S- and P-polarized light into beam 954 and to transmit the remainder in beam 956. The angularly separated beams propagate through the neutral gelatin layer 948 and strike hologram 946. Hologram 946 is designed to diffract beam 954 with 100% efficiency for the S and P polarizations, producing beam 958, and to transmit beam 956 undeviated. Hologram 946 diffracts beam 958 within 5 degrees of beam 956. This blur filter is not polarization sensitive because the holograms have equal S- and P-polarization efficiency and split the incident beam into equal irradiance beams.

Figure 25:
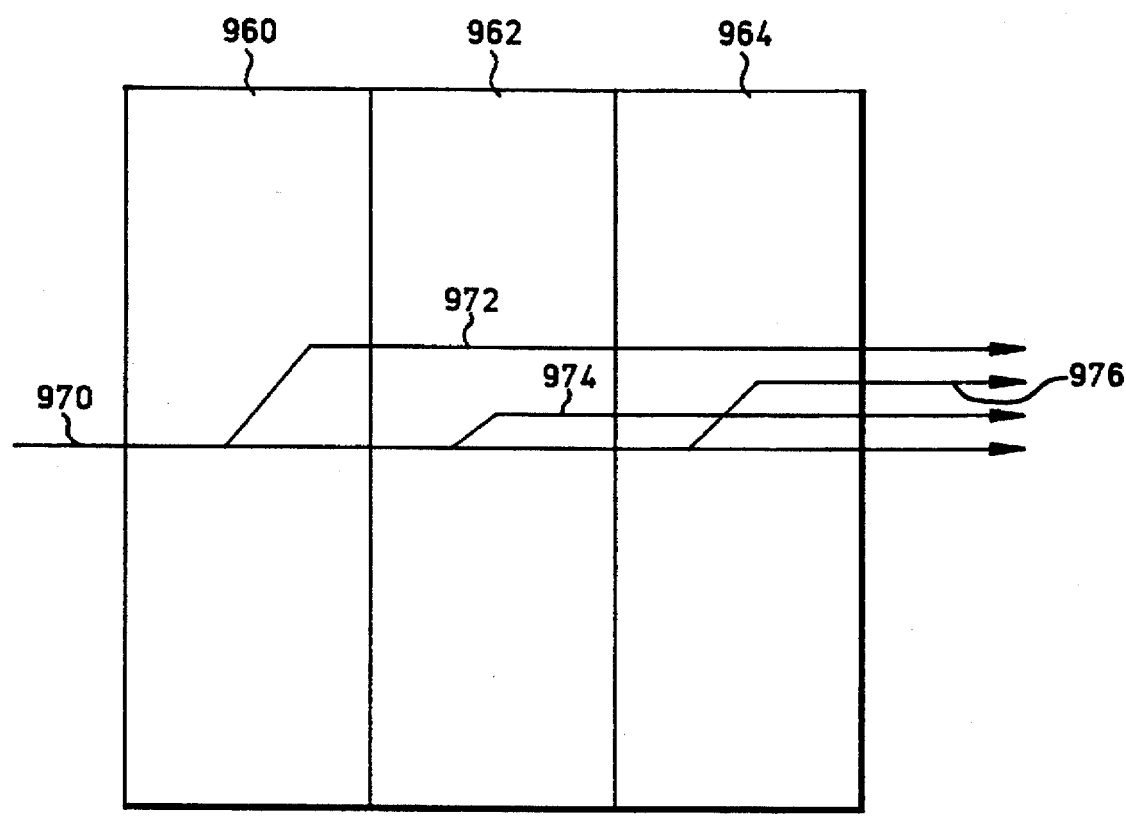
FIG. 25 is a cross-sectional view of a third volume hologram blur filter of a holographic optical system of the present invention.

Blur filters can be designed for other wavelengths and combined to make filters useful for color imaging, as depicted in FIG. 25. A holographic blur filter constructed in the manner described above has the advantage that the blur spacing can be designed individually for each color to match the pixel spacing associated with each color. In addition, the holographic blur filter can be designed to blur an image for the range of wavelengths associated with the spectral sensitivity of the pixels. Thus, the blue blur filter 960 will blur only the blue light in the incoming beam 970, producing beam 972, and transmit the green and red light unaffected; similarly, the green and red blur filters 962 and 964 blur only green and red components of incoming beam 970, producing beams 974 and 976 whose spacing from the incoming beam can be different from that of the blue beam 972. Each blur filter 960, 962 and 964 is constructed similarly to the blur filter 922 and includes a pair of hologram structures separated by a spacer layer. Appropriate design parameters are determined from formulas (1)–(12).

Holographic blur filters can also be combined to form two-dimensional blur filters by stacking them together using the same techniques as used with conventional birefringent filters.

Accordingly, several preferred embodiments of a holographic optical system have been shown and described. It will be understood, however, that modifications and adaptations thereof will occur to persons skilled in the art. Therefore, the protection afforded the invention should not be limited except in accordance with the appended claims and their equivalents.

We claim:

1. A holographic optical waveplate system comprising:
   a radiation source producing a radiation beam having a selected wavelength;
   a first volume hologram positioned to receive said radiation beam from the radiation source, having a maximum diffraction efficiency in a first polarization direction and a minimum diffraction efficiency in a second polarization direction orthogonal to said first polarization direction;
   a second volume hologram having a maximum diffraction efficiency in one of said first and second polarization directions and a minimum diffraction efficiency in the other of said first and second polarization directions;
   said first hologram being joined to said second hologram by a refractive index matching adhesive; and
   said first and second holograms having a hologram thickness T, an average index of refraction $n_0$, an internal angle of incidence $\alpha$, an internal angle of diffraction $\beta$, and an external angle of incidence $\theta_{Do}$ so as to impart a predetermined propagation delay $\delta(T)$ representing a multiple of one-quarter of the wavelength of said radiation beam between radiation polarized in one of said first and second polarization directions relative to radiation polarized in the other of said first and second polarization directions in order to provide a characteristic radiation output beam polarization, said hologram thickness T, said average index of refraction $n_0$, said internal angle of incidence $\alpha$, said internal angle of diffraction $\beta$, and said external angle of incidence $\theta_{Do}$ being selected to provide said predetermined propagation delay $\delta(T)$ in accordance with the relationship
   $\delta L(T)=T(n_0((1/\cos(\alpha))-(1/\cos(\beta)))+(\tan(\alpha)+\tan(\beta)) * \sin(\theta_{Do}))$.

2. The holographic optical system of claim 1 wherein said propagation delay is $(n/2+\frac{1}{4})$ W, where n is an integer and W is the wavelength of said radiation beam, and said output beam is circularly polarized.

3. The holographic optical system of claim 1 wherein said propagation delay is $(n/2+\frac{1}{2})$ W, where n is an integer and W is the wavelength of said radiation beam, and said output beam has the opposite polarization to said input beam.

4. The holographic optical system of claim 1 wherein said first and second holograms are constructed to receive an input beam at a first angle of incidence and to produce a pair of substantially parallel output beams at an angle with respect to said input beam.

5. The holographic optical system of claim 1 wherein said first and second holograms are constructed to receive an input beam at a first angle of incidence and to produce a pair of substantially parallel output beams in a direction substantially parallel to said input beam.

6. The holographic optical system of claim 1 wherein said first and second holograms are mounted to respective substrates forming respective beam input and beam output surfaces.

7. The holographic optical system of claim 1 wherein said first hologram has a maximum diffraction efficiency relative to light polarized in said first polarization direction and said second hologram has a maximum diffraction efficiency relative to light polarized in said second polarization direction.

8. The holographic optical system of claim 1 wherein said first hologram has a maximum diffraction efficiency relative to light polarized in said first polarization direction and said second hologram also has a maximum diffraction efficiency relative to light polarized in said first polarization direction.

9. A holographic optical system comprising a radiation source and first and second volume holograms positioned to receive radiation from the radiation source, said holograms each being made of processed dichromated gelatin having an average index of refraction $n_0$ of approximately 1.26, and said holograms each being constructed on the basis of said average index of refraction $n_0$ being approximately 1.26 so as to have selected maximum diffraction efficiencies relative to selected polarization directions, said first and second holograms being arranged in a multi-layered structural relationship with an intermediate index-matching material therebetween having an average index of refraction of approximately 1.26 to form a high efficiency composite bidiffractive element, said bidiffractive element providing a first propagation path for incident light polarized in a first polarization direction and a second propagation path for incident light polarized in a second polarization direction, said first and second propagation paths being of unequal length so as to provide a predetermined propagation delay between light polarized in said first direction and light polarized in said second direction.

10. The holographic optical system of claim 9 wherein said first and second holograms have the same diffraction efficiencies relative to the same polarization directions.

11. The holographic optical system of claim 9 wherein said first and second holograms have different diffraction efficiencies relative to the same polarization directions.

12. The holographic optical system of claim 9 wherein said first and second holograms are mounted to respective substrates forming respective beam input and beam output surfaces.

13. The holographic optical system of claim 9 wherein said delay is one-quarter wavelength and said output beam is circularly polarized.

14. The holographic optical system of claim 9 wherein said delay is one-half wavelength and said output beam is polarized opposite to the input beam.

15. A holographic optical system, comprising:

a laser light source for emitting a light beam when energized;

an optical disk, said optical disk having information encoded as reflectance variations on a surface thereof;

means for rotating the optical disk about a drive axis;

beam directing means for directing the light beam emitted by said laser light source to the surface of the optical disk, said beam directing means providing a light path including a beam splitter and a quarter-waveplate, said quarter-waveplate including a holographic waveplate comprising first and second volume holograms made from dichromated gelatin, said holograms each having differential diffraction efficiencies relative to selected polarization directions, said first and second holograms being arranged in a multi-layered structural relationship to form a composite bidiffractive element, said bidiffractive element providing a first propagation path for incident light polarized in a first polarization direction and a second propagation path for incident light polarized in a second polarization direction, said first and second volume holograms each being constructed so as to have a thickness T, an average index of refraction $n_0$ of approximately 1.26, an internal angle of incidence $\alpha$ calculated on the basis of said average index of refraction $n_0$ being approximately 1.26 in accordance with the relationship $\alpha = \mathrm{asin}\ (\sin/1.26)$, where $\theta_{Do}$ is the external angle of incidence, an internal angle of diffraction $\beta$ calculated on the basis of said average index of refraction $n_0$ being approximately 1.26 in accordance with the relationship $\phi = (\pi/2) - (\beta - \alpha)/2$, where $\phi$ is Bragg plane tilt, and an external angle of incidence $\theta_{Do}$, such that said first and second propagation paths are of unequal length by a multiple of one-quarter wavelength in accordance with the relationship $\delta L(T) = T(1.26((1/\cos(\alpha)) - (1/\cos(\beta))) + (\tan(\alpha) + \tan(\beta)) * \sin(\theta_{Do}))$, where $\delta L(T)$ is the path length difference between radiation polarized in the first and second directions;

detector means for receiving the light beam after it has been reflected by the optical disk for generating an output signal representative of the information encoded on the optical disk; and information recovery means for processing the output signal and generating data signals representative of the information encoded on the optical disk.

16. A holographic optical system, comprising:

a laser light source for emitting a light beam when energized;

a magneto-optical disk, said magneto-optical disk having information encoded on a surface thereof as variations in magnetization orientation;

means for rotating the magneto-optical disk about a drive axis;

beam directing means for directing the light beam emitted by said laser light source to the surface of the magneto-optical disk, said beam directing means providing a light path including a polarization selective beam splitter and a half waveplate, said half waveplate including a holographic waveplate comprising first and second volume holograms made from dichromated gelatin, said holograms each having differential diffraction efficiencies relative to selected polarization directions, said first and second holograms being arranged in a multi-layered structural relationship to form a composite bidiffractive element, said bidiffractive element providing a first propagation path for incident light polarized in a first polarization direction and a second propagation path for incident light polarized in a second polarization direction, said first and second volume holograms each being constructed so as to have a thickness T, an average index of refraction $n_0$ of approximately 1.26, an internal angle of incidence $\alpha$ calculated on the basis of said average index of refraction $n_0$ being approximately 1.26 in accordance with the relationship $\alpha = \mathrm{asin}\ (\sin/1.26)$, where $\theta_{Do}$ is the external angle of incidence, an internal angle of diffraction $\beta$ calculated on the basis of said average index of refraction $n_0$ being approximately 1.26 in accordance with the relationship $\phi = (\pi/2) - (\beta - \alpha)/2$, where $\phi$ is Bragg plane tilt, and an external angle of incidence $\theta_{Do}$, such that said first and second propagation paths are of unequal length by a multiple of one-half wavelength in accordance with the relationship $\delta L(T) = T(1.26((1/\cos(\alpha)) - (1/\cos(\beta))) + (\tan(\alpha) + \tan(\beta)) * \sin$ ($\theta_{DO}$)), where $\delta L(T)$ is the path length difference between radiation polarized in the first and second directions;

detector means for receiving the light beam after it has been reflected by the magneto-optical disk for generating an output signal representative of the information encoded on the magneto-optical disk; and information recovery means for processing the output signal and generating data signals representative of the information encoded on the magneto-optical disk.

17. A holographic optical blur filter system for use with a video detector having a plurality of adjacent detector elements, comprising:

a first volume hologram mounted on a substrate for receiving an input radiation beam and diffracting a first portion of the input radiation beam as a first beam and transmitting a second portion of the input radiation beam as a second beam;

a second volume hologram mounted on a substrate for receiving the first and second beams and diffracting one of the beams while transmitting the other beam, said first and second beams being directed at angles that are substantially parallel to each other;

a spacer positioned between the first and second volume holograms, said spacer's thickness being chosen to provide a selected amount of spatial separation between the first and second beams as they pass through the second volume hologram in accordance with the relationship $D(T_g)=T_g (\tan \theta_d)+(T(\tan \beta)$, where $D(T_g)$ is the spatial beam separation for a given spacer thickness, $T_g$ is the spacer thickness, $\theta_d$ is the external angle of incidence and $\beta$ is the internal angle of diffraction, said selected amount of spatial separation being substantially equal to a dimension of said detector elements; and wherein the input radiation beam may include first and second polarization components of different direction and the first and second volume holograms have different diffraction efficiencies relative to the first and second polarization components, which different diffraction efficiencies are used to generate the first and second beams.

18. The holographic optical system of claim 17 wherein the first and second volume holograms both have a maximum diffraction efficiency relative to the first polarization direction and a minimum diffraction efficiency relative to the second polarization direction.

19. The holographic optical system of claim 17 wherein the first volume hologram has a maximum diffraction efficiency relative to the first polarization direction and the second volume hologram has a maximum diffraction efficiency relative to the second polarization direction.

20. The holographic optical system of claim 17 wherein the diffraction efficiency of the first and second volume holograms is dependent on wavelength deviation of the input radiation beam from an optimum Bragg wavelength.

21. The holographic optical system of claim 17 wherein the spatial separation of the first and second beams as they pass through the second volume hologram is a function of wavelength deviation of the input radiation beam from an optimum Bragg wavelength.

22. The holographic optical system of claim 17 further having a spatial beam separation that is wavelength dependent.

23. The holographic optical system of claim 17 wherein the first hologram has a diffraction efficiency of about 50% for each polarization component, and the second hologram has a diffraction efficiency of about 100% for each polarization component.

24. A holographic optical system, comprising a plurality of holographic blur filters arranged in a stacked relationship, with non-polarization retardant spacers therebetween, along the direction of an input light beam, each filter diffractively responding to a specific range of radiation wavelengths by selectively dividing said range of radiation wavelengths into first and second polarization components which are parallel to each other and separated a predetermined distance from one another.

25. The holographic optical system of claim 24 wherein each said holographic blur filter produces a different beam separation.

* * * * *